US008437790B1

(12) United States Patent
Hassan et al.

(10) Patent No.: US 8,437,790 B1
(45) Date of Patent: May 7, 2013

(54) LOCATION DETERMINATION FOR WHITE SPACE UTILIZATION

(75) Inventors: Amer A. Hassan, Kirkland, WA (US); Billy R. Anders, Jr., Bothell, WA (US); Danny Allen Reed, Redmond, WA (US); Paul William Garnett, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/315,053

(22) Filed: Dec. 8, 2011

(51) Int. Cl.
H04B 7/00 (2006.01)

(52) U.S. Cl.
USPC ........... 455/509; 455/522; 455/423; 370/329; 370/331

(58) Field of Classification Search .................. 455/509, 455/114.2, 423; 370/329, 338, 462
See application file for complete search history.

(56) References Cited

U.S. PATENT DOCUMENTS

| | | | |
|---|---|---|---|
| 2004/0028017 | A1 | 2/2004 | Whitehill |
| 2006/0073840 | A1 | 4/2006 | Akgun |
| 2008/0268871 | A1 | 10/2008 | Kim |
| 2008/0268892 | A1* | 10/2008 | Hamdi et al. ................ 455/522 |
| 2009/0217357 | A1 | 8/2009 | Dell'Uomo |
| 2010/0075704 | A1* | 3/2010 | McHenry et al. ............. 455/509 |
| 2010/0087166 | A1 | 4/2010 | Agashe |
| 2010/0220687 | A1* | 9/2010 | Reznik et al. ................ 370/331 |
| 2010/0309806 | A1* | 12/2010 | Wu et al. ...................... 370/252 |
| 2011/0164581 | A1* | 7/2011 | Keon .......................... 370/329 |
| 2011/0286405 | A1* | 11/2011 | Kim et al. .................... 370/329 |

OTHER PUBLICATIONS

Guaranteeing the Authenticity of Location Information—Published Date: Jul. 9, 2008—Proceedings: In Proceedings of Pervasive Computing, IEEE, vol. 7, Issue 3, Jul.-Sep. 2008;Author: Gonzalez-Tablas Ferreres, A.I. Ramos Alvarez, B. Garnacho, A.R. Pages: NA; http://ieeexplore.ieee.org/stamp/stamp.jsp?tp=&arnumber=4563914.

Location-Dependent Database Access—Retrieved Date: Aug. 10, 2011 Proceedings: NA; Author: Faïza Najjar, Sean Kelley, Margaret H. Dunham Pages: NA; http://lyle.smu.edu/~mhd/8331s08/ldd.doc.

Bootstrapping a Location Service Through Geocoded Postal Addresses—Published Date: 2007; Proceedings:In Proceedings of the 3rd International Conference on Location-and Context-Awareness, 2007;Author: Gayathri Chandrasekaran, Mesut Ali Ergin, Marco Gruteser, Richard P. Martin; Pages: NA; http://citeseerx.ist.psu.edu/viewdoc/download?doi=10.1.1.85.9807&rep=rep1&type=pdf.

* cited by examiner

Primary Examiner — Mahendra Patel
(74) Attorney, Agent, or Firm — L. Alan Collins; Collins & Collins Intellectual, LLC

(57) ABSTRACT

A technique for a wireless device to obtain white space information from a component configured for cellular communication, such as a cellular phone. The wireless device and cellular phone may communicate using a short-range connection, such as a peer-to-peer connection, ensuring that the white space information, which is location based, generated by the cellular phone is also accurate for the location of the wireless device. With such white space information, the wireless device can comply with regulatory requirements for white space use by accessing a regulatory database identifying, by location, available white space channels. When the cellular phone is configured for accessing a wide area network, the cellular telephone may provide the white space information as a set of channels available for white space communication. Channels of the set may be prioritized based on one or more parameters, including frequency, permitted transmit power or detected noise.

14 Claims, 8 Drawing Sheets

LOCATION DETERMINATION FOR WHITE SPACE UTILIZATION

BACKGROUND

Wireless transmissions are used for wireless networking among computing devices as well as in other settings, such as to support broadcast of radio and television content. To avoid interference between the signals of different users, different portions of the electromagnetic spectrum are allocated to different uses.

The radio spectrum has been divided administratively into two primary sectors: the licensed spectrum and the unlicensed spectrum. The licensed spectrum consists of frequencies that have been licensed to organizations, such as commercial broadcasters, for exclusive use by those organizations. For example, a portion of the spectrum may be licensed to a cellular communications company for use in communicating information representing voice and data calls placed by its subscribers, or licensed to a media broadcaster to transmit signals carrying audio and video data representing television content. The unlicensed spectrum, on the other hand, has been allocated for free use by the public. The unlicensed spectrum includes a band allocated for industrial, scientific and medical uses (the ISM band), which is frequently used for intra-computer communications. Though operation in these bands does not require a license, typically, use of the unlicensed spectrum requires operating in accordance with some regulations, such as maximum power output regulations, that are designed to minimize interference between users.

Despite this administrative distinction between licensed and unlicensed spectra, unused portions of the licensed spectrum are sometimes used for unlicensed communications. Unused portions may arise, for example, because, when frequency bands of the licensed spectrum are assigned to organizations, typically they are not assigned exactly consecutively. Instead, in a given location, there may be gaps between the licensed portions to prevent transmissions of two licensed users from interfering with one another. The unassigned band of the licensed spectrum is referred to as "white space." These white spaces may be intended to provide frequency separation to reduce interference between the signals of licensed users. Additionally, white spaces may arise because, in a particular location, the licensed users do not collectively require the full spectrum.

White spaces of the licensed spectrum are sometimes used by unlicensed transmitters. By government regulation, use of white space in this way requires using techniques that prevent interference with signals of the licensed users. Generally, these techniques require an unlicensed wireless device to access a database of white space channels. The database contains information that indicates, for any location, which channels within a licensed spectrum are available for use as white space. Regulations prescribe the accuracy with which a wireless device must know its location in order to use information from the regulatory database to identify available white space channels.

SUMMARY

A wireless device capable of communicating in white space of a licensed spectrum may obtain white space information from a component configured for cellular communication, such as a mobile phone. This white space information may be based on a present location of the component, which can then be used by the wireless device to identify a white space channel. The component may have access to location information, such as from GPS circuitry or through communication with multiple cellular base stations. In some embodiments, the component may communicate with the wireless device using a peer-to-peer connection, or other short-range communication technique, such that the location of the component acts as a reliable indication of the location of the wireless device.

The component configured for cellular communication may also provide other information, such as an indication of the reliability of the white space information. The reliability may indicate, for example, whether the white space information was based on a location determination accurate enough to comply with regulatory requirements. This reliability information may be generated based on the manner in which the component obtained location information used in the white space information.

In some embodiments, the wireless device may act as an access point to a wide area network. The wireless device may use white space information received from a component configured for cellular communication to access a regulatory database over this network to identify white space channels in its location. Such an approach may be useful when the white space information identifies a location. Alternatively or additionally, the component configured for cellular communication may access a regulatory database, using location information, to identify one or more white space channels, which may then be provided to an access point of other device seeking a channel to use for wireless communication. Accordingly, the component configured for cellular communication may provide the white space information in any suitable format, including as a location or as one or more white space channels available for use in the location of the wireless device.

In some embodiments, the component may provide channel information as a prioritized set of channels. A prioritization may be made among available white space channels using one or more criteria. These criteria may include propagation characteristics for the channels, limitations on transmit power in the channels such as may arise when adjacent channels are in use and/or information indicating congestion or other noise in the channels.

The component configured for cellular communication may provide white space information in response to any suitable triggering event. In some embodiments, the component may present an interface through which a wireless device can request white space information. Alternatively or additionally, the component may provide a registration service through which the wireless device can request on-going updates. The component may then generate an update periodically or in response to some other trigger event, such as when the component has moved more than some threshold amount. As yet a further alternative, the component may periodically broadcast white space information using peer-to-peer communication or other short-range communication.

Accordingly, in some aspects, the invention relates to a method of operating an electronic device to communicate in white space of a licensed spectrum. The method may involve obtaining white space information from a component configured for cellular communication. A wireless communication sub-system of the electronic device may be configured based at least in part on the white space information.

In another aspect, the invention relates to at least one computer-readable storage medium comprising computer-executable instructions that, when executed, control a portable electronic device configured for communication on a cellular band. The portable electronic device may obtain location information. The device may then generate white space information based on the location information and transmit the white space information using a peer-to-peer connection.

In another aspect, the invention relates to a method of operating a portable electronic device configured for wireless communication over a cellular network. The method may comprise obtaining location information and accessing a regulatory database using a data connection through the cellular network to generate white space information based on the location information. The portable electronic device then may communicate the white space information using a peer-to-peer wireless connection.

It should be appreciated that the foregoing is intended to be a non-limiting summary of the invention, which is defined only by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
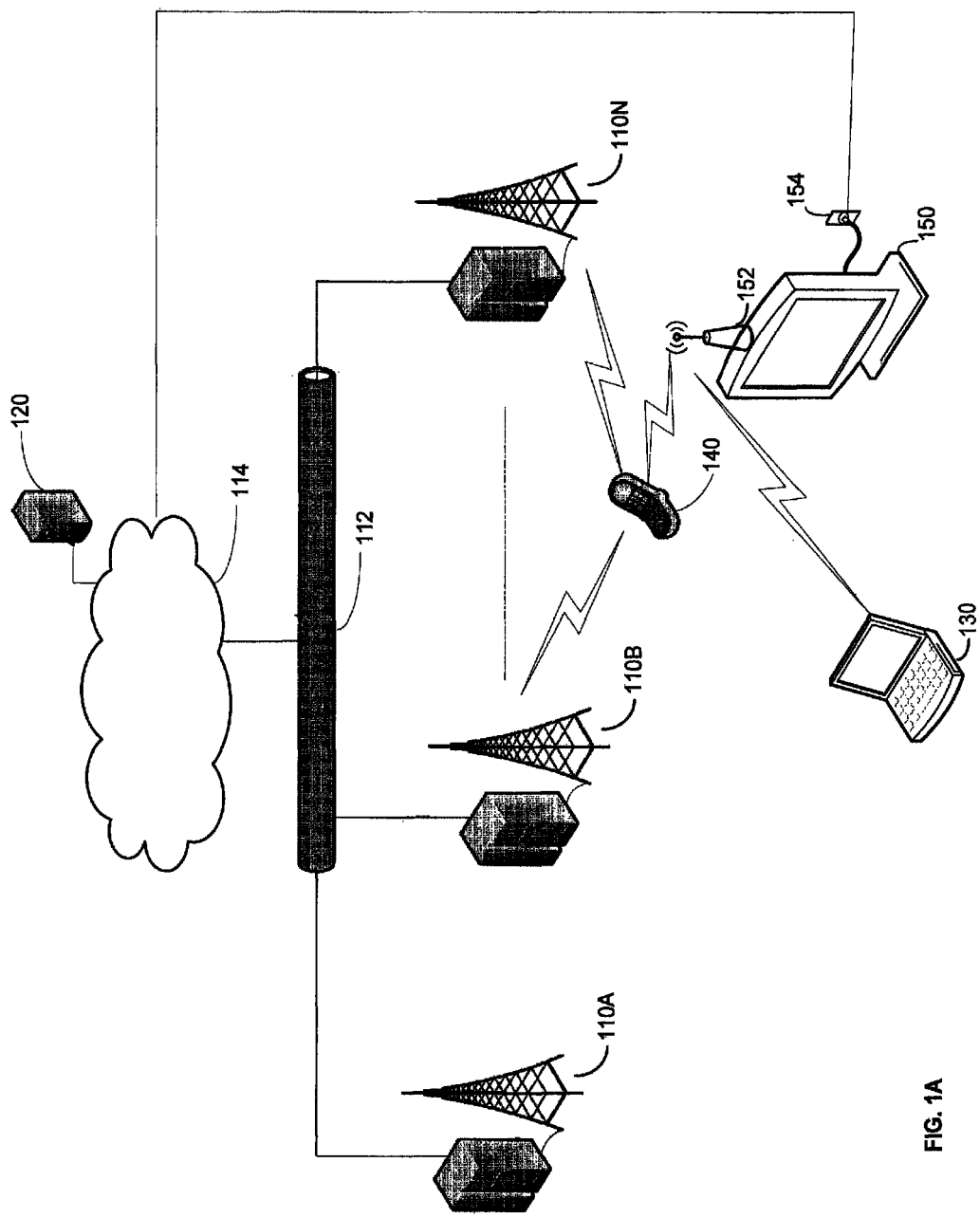
FIG. 1A is an illustration of an exemplary system in which techniques in accordance with some of the principles described herein may operate.

The Inventors have recognized and appreciated that operation of a wireless device, such as a computer configured for wireless communication, could be improved by providing a simple and effective mechanism to use white space in a licensed spectrum, such as the Digital TV spectrum, for wireless communication. The Inventors have further recognized and appreciated that use of white space may be expanded with a simple and effective mechanism to obtain white space information, suitable to meet regulatory requirements, and from which white space channels in a particular location can be identified.

The Inventors have further recognized and appreciated that such improved operation of wireless devices may be achieved by obtaining white space information from a component configured for cellular communication. Moreover, the Inventors have recognized and appreciated wireless devices that could benefit from being configured for wireless communication in a white space channels are frequently operated in the vicinity of components configured for cellular communication. Such components may conventionally contain one or more mechanisms for location determination. A component configured for cellular communication, for example, may contain GPS circuitry or may communicate with multiple base stations, each providing location information from which the component can triangulate its position. These, and in some embodiments other techniques, may allow the component configured for cellular communication to determine its location with sufficient accuracy to meet regulatory requirements for white space determination.

As a result, the component configured for cellular communication may have access to information that, in many scenarios, will reveal its location with sufficient accuracy to meet regulatory requirements. However, there may be scenarios in which the component does not obtain information that is accurate enough. To accommodate for such a scenario, the component may be configured to determine whether it has obtained location information of sufficient accuracy. That determination may be reported through an interface in conjunction with the white space information.

Any suitable mechanism may be used to determine whether the location information has an accuracy meeting regulatory requirements, and the specific mechanism used may depend on the technique used to determine location. In some embodiments, the mechanism by which the location information is obtained may be used to determine its reliability. As a specific example, if the component is configured with a GPS receiver, that has an accuracy better than required by regulation, any location determined by the GPS may be reported as accurate enough. Such an approach may be suitable, for example, for complying with regulations that require location to be ascertained with an accuracy of +/−50 feet. A conventional GPS for example, may have a resolution on the order of 10 feet and may be suitable for determining a location that can be the basis of reliable white space information.

In other scenarios, triangulation techniques based on distance to one or more cellular base stations may be used. Triangulation techniques may be used, for example, when a GPS signal cannot be detected, the component configured for cellular communication does not contain GPS hardware or the GPS hardware is malfunctioning. Triangulation techniques may deliver information that is accurate enough in some scenarios, which may depend on the number of base stations from which the component can receive signals. Though, other factors may also effect accuracy, including noise in the signals received from one or more of the base stations. Accordingly, in some embodiments, the reliability of location information may be determined by the component configured for cellular communication dynamically based on actual operating conditions. Reliability information may be reported along with the white space information.

Reliability information may be reported in any suitable way. The component configured for cellular communication may be in communication with a component of a wireless device that configures the wireless device for white space communication. As a result, the white space information may be available for configuring the wireless device. This communication may occur via any suitable mechanism. In some embodiments, the component may be in a device that includes a radio capable of establishing a short-range connection with the wireless device. As a specific example, a cellular phone may contain a radio configured for establishing peer-to-peer connections using WI-FI Direct, BLUETOOTH or other suitable peer-to-peer protocol. As another example, a component configured for cellular communication may be embedded in a computing device, such as a tablet computer, and may be configured to communicate with other components of the computing device via an internal structure of the wireless device, such as a bus.

Regardless of how the component configured for cellular communication communicates white space information to the component that configures the wireless device, the component that configures the device may use that information to identify a white space channel that is available for use in the location of the wireless device. Such a white space channel may be identified in any suitable way. In some embodiments, the white space information may identify a location of the component configured for cellular communication, which, because of the use of a short-range communication technique identifies the location of the wireless device. The white space information may identify the location with sufficient accuracy that it may be reliably used to access a regulatory database to determine white space channels in the location. Such an embodiment may be useful, for example, in scenarios in which the wireless device has a connection to the Internet or other wide area network (WAN) over which a regulatory database may be accessed.

In other embodiments, the white space information may be in the form of one or more white space channels in the location. One or more channels may be identified by the component configured for cellular communication in any suitable way, including via a WAN over which a regulatory database may be accessed. Many cellular phones or other cellular appliances support connections to the Internet through the cellular network, or other WAN. As a result, the component configured for cellular communication may access a regulatory database and, using location information, may determine white space channels in the location.

Regardless of which device uses location information to determine white space channels in a location, the available channels may be prioritized. The channels may be prioritized, for example, in the component configured for cellular communication or in the wireless device that receives the white space information from such a device. The channels may be prioritized based on suitability for carrying data communications. Any suitable criteria may be used for quantitatively assessing suitability. In some embodiments, the frequency of the channels may be used for prioritization. In the Digital TV spectrum, for example, signals in channels of lower frequency better propagate through walls and those channels may be given a higher priority. Another factor that may be used in prioritizing channels is an allowable power level in the channel. Some regulations, for example, limit transmit power level in white space channels when an adjacent channel is assigned to a licensed user. Channels with higher permitted power levels may be give higher priority. As yet another example, noise levels in channels may be monitored and channels with less noise may be given higher priority.

A system for selecting a white space channel as described herein may be applied in any suitable scenario. FIG. 1A shows an exemplary environment in which some embodiments of the invention may operate. The environment of FIG. 1A includes a wireless device and a separate device that includes a component configured for cellular communication. In the example of FIG. 1A, a device containing a component configured for cellular communication is illustrated by cellular telephone 140. The wireless device is illustrated as an access point 152. The access point 152 may be used for any suitable purpose. However, in the embodiment illustrated in FIG. 1A, access point 152 is integrated with a television receiver 150. Integrating access point 152 with television receiver 150 allows wireless devices to stream media for display by television 150.

In the example illustrated in FIG. 1A, a wireless computing device 130 is shown in proximity to television 150 with access point 152. Accordingly, wireless computing device 130 may establish a wireless connection to television 150 through access point 152. Over such a connection, wireless computing device 130 may stream media for display on television 150. However, the specific type of data communicated in a white space channel and the purpose for which it is communicated is not critical to the invention.

The specific mechanism by which wireless computing device 130 communicates with access point 152 also is not critical to the invention. For example, access point 152 may operate according to a Wi-Fi infrastructure mode protocol, but may alternatively or additionally operate according to a Wi-Fi Direct peer-to-peer protocol. Though, rather than exclusively using channels in the ISM band conventionally used for Wi-Fi communications, access point 152 and wireless computing device 130 may be configured to communicate over a white space channel in a licensed spectrum. As a specific example, access point 152 and wireless computing device 130 may be configured to alternatively or additionally communicate over a white space channel in the digital TV spectrum.

In accordance with regulations governing use of white space in the digital TV spectrum, a device initiating communication using the digital TV spectrum must first reliably determine that a channel of the digital TV spectrum is unused in its location and therefore available for use as white space. In the embodiment of FIG. 1A, access point 152 identifies a white space channel and, using handshaking in accordance with the Wi-Fi protocol or other suitable mechanism, communicates the selected channel to wireless computing device 130. Each of the communicating devices, access point 152 and wireless computing device 130, may then configure themselves for communication over the same white space channel.

In the embodiment of FIG. 1A, access point 152 may select the white space channel based on white space information provided by cellular telephone 140. White space information may be communicated from cellular telephone 140 to access point 152 in any suitable way. In the embodiment illustrated, white space information is communicated over a wireless connection formed between cellular telephone 140 and access point 152. That connection may be formed in any suitable way. In the example of FIG. 1A, a connection is formed using a short range protocol. For example, a peer-to-peer connection may be formed using a Wi-Fi Direct protocol.

The white space information communicated from cellular telephone 140 to access point 152 may be based on location information generated by cellular telephone 140. Many conventional cellular telephones include GPS receivers capable of accurately determining a location of the cellular telephone. Location information generated by such a GPS receiver within a cellular telephone 140 may be the basis of white space information communicated by cellular telephone 140.

Though, other mechanisms may be used by cellular telephone 140 to determine its location. In the example illustrated, a cellular network to which cellular telephone 140 may connect includes multiple base stations, of which base stations 110A, 110B . . . 110N are illustrated in FIG. 1A. Cellular telephone 140 may be in communication with a subset of these base stations. By communicating with a base station, such as one of base stations 110A, 110B . . . 110N, cellular telephone 140 may determine its distance from that base station. In addition, through communication with a base station, cellular telephone 140 may obtain information about the location of the base station.

Location information obtained by communicating with a single base station, though it provides some indication of the location of cellular telephone 140, may not provide information about the location of cellular telephone 140 that is accurate enough to meet regulatory requirements for identifying a white space channel. For example, regulations may require that a device selecting a white space channel make the selection for a specific location that is determined with a relatively high accuracy, such as +/−50 feet. In contrast, location information obtained by communicating with a single base station may allow determination that the cellular telephone is within a geographic region, but that geographic region may be a square mile or more.

The accuracy with which the location of cellular telephone 140 can be determined may be improved using communications with multiple base stations. Each additional base station with which cellular telephone 140 can communicate provides additional information allowing the location of cellular telephone 140 to be more accurately determined. In some embodiments, communication with more than three base stations may provide location information with sufficient accuracy to meet regulatory requirements. Though, it should be appreciated that more than three base stations only serves as an example of a criteria for determining whether cellular telephone 140 has accurately determined its location based on communications with base stations. In some embodiments, a different number of base stations may be used as a threshold for determining whether location information is accurate enough to meet regulatory requirements. Alternatively or additionally, other criteria related to communication with base stations may be used for determining accuracy. As a specific example, signal strength and/or signal to noise ratio of communications with base stations may be used as a criteria. As another example, the geographic dispersion of the base stations with which cellular telephone 140 can communication may also be used as a criteria, with wider separation of base stations being used as an indication of more accurate location determination.

Regardless of the manner in which cellular telephone 140 obtains location information, that information may serve as the basis for white space information provided to access point 152. That white space information may be provided in conjunction with an indication of the reliability of the information. For example, if the location is determined using a GPS receiver, the white space information may be reported as being highly reliable. Conversely, if the location is determined based on a number of base stations below a threshold, the white space information may be reported as having low reliability. Accordingly, an indicator of reliability may be reported in conjunction with the white space information. Such an indicator may be in the form of a flag, which may be set to indicate that the location has been determined with sufficient accuracy to meet regulatory requirements. However, the reliability indicator may be formatted in any suitable way.

The white space information may be in any suitable form. In some embodiments, cellular telephone 140 may report the location information as the white space information. Alternatively or additionally, cellular telephone 140 may generate the white space information by processing the location information. Such processing may serve to identify white space channels in the location of cellular telephone 140. Cellular telephone 140 may process the location information in any suitable way to identify white space channels. In some embodiments, that processing may entail accessing a regulatory database that contains information about white space channels in multiple locations. By reading entries from the database corresponding to the location of cellular telephone 140, cellular telephone 140 may determine white space channels available for its location. Any suitable mechanism may be used for accessing a regulatory data base.

In the embodiment of FIG. 1A, a regulatory data base is maintained by a server 120 that is accessible over a wide area network, such as the Internet 114. As is known in the art, a cellular telephone may be configured for accessing the Internet 114 through the cellular network 112. Accordingly, in some embodiments, cellular telephone 140 may use conventional network access techniques to access a regulatory database on a server 120. Though it should be appreciated that any suitable technique may be used to gain access to regulatory information.

In some embodiments, processing components associated with access point 152 may alternatively or additionally process location information generated by cellular telephone 140. That processing may include accessing a regulatory database to determine, based on location, white space channels for a location. Any suitable mechanism for accessing information on white space channels based on location may be employed.

In the example of FIG. 1A, access point 152 is part of an overall electronic device, specifically television 150. In this example, television 150 has a cable connection 154 that may provide access to internet 114. Accordingly, processing components associated with access point 152 may access over a wide area network, such as Internet 114, regulatory information. Though, it should be appreciated that any wired or wireless communication techniques may be used by processing components associated with access point 152 to gain access to regulatory information or other information necessary for processing location information in order to identify white space channels in the location of access point 152.

In the example illustrated in FIG. 1A, cellular telephone 140 is located in the proximity of access point 152, but is nonetheless separated from access point 152. Accordingly, the location of cellular telephone 140 is not the precise location of access point 152 and wireless computing device 130 that may communicate with access point 152 using an identified white space channel. However, in the embodiment illustrated, cellular telephone 140 is close enough to access point 152 that the determined location of the cellular telephone 140 is sufficiently accurate for selecting white space channels for the location of access point 152. This condition may be ensured by techniques that verify the positioning of cellular telephone 140 relative to access point 152. For example, processing components associated with access point 152 may be programmed to use a range finding technique to determine the distance between access point 152 and cellular telephone 140. Range finding techniques as are known in the art may be suitable for this purpose.

Regardless of the manner in which the distance between cellular telephone 140 and access point 152 is determined, use of white space information from cellular telephone 140 may be conditioned on the distance being less than some threshold amount. However, it should be appreciated that an express range measurement is not a requirement of the invention. As an alternative, a communication mechanism between cellular telephone 140 and access point 152 may be adapted for short range communication. The communication, for example, may be a peer-to-peer communication. In such a scenario, if access point 152 is able to establish a connection to cellular telephone 140 using the short range communication, the location of cellular telephone 140 may inherently be close enough to the location of access point 152 to use as a basis for obtaining localized white space information. Though, is should also be appreciated that technology measures to ensure cellular telephone 140 and access point 152 are in sufficiently close proximity may not be required. In some embodiments, for example, proximity of cellular telephone 140 may result from the fact that a user of television 150 may be carrying cellular telephone 140.

Figure 1B:
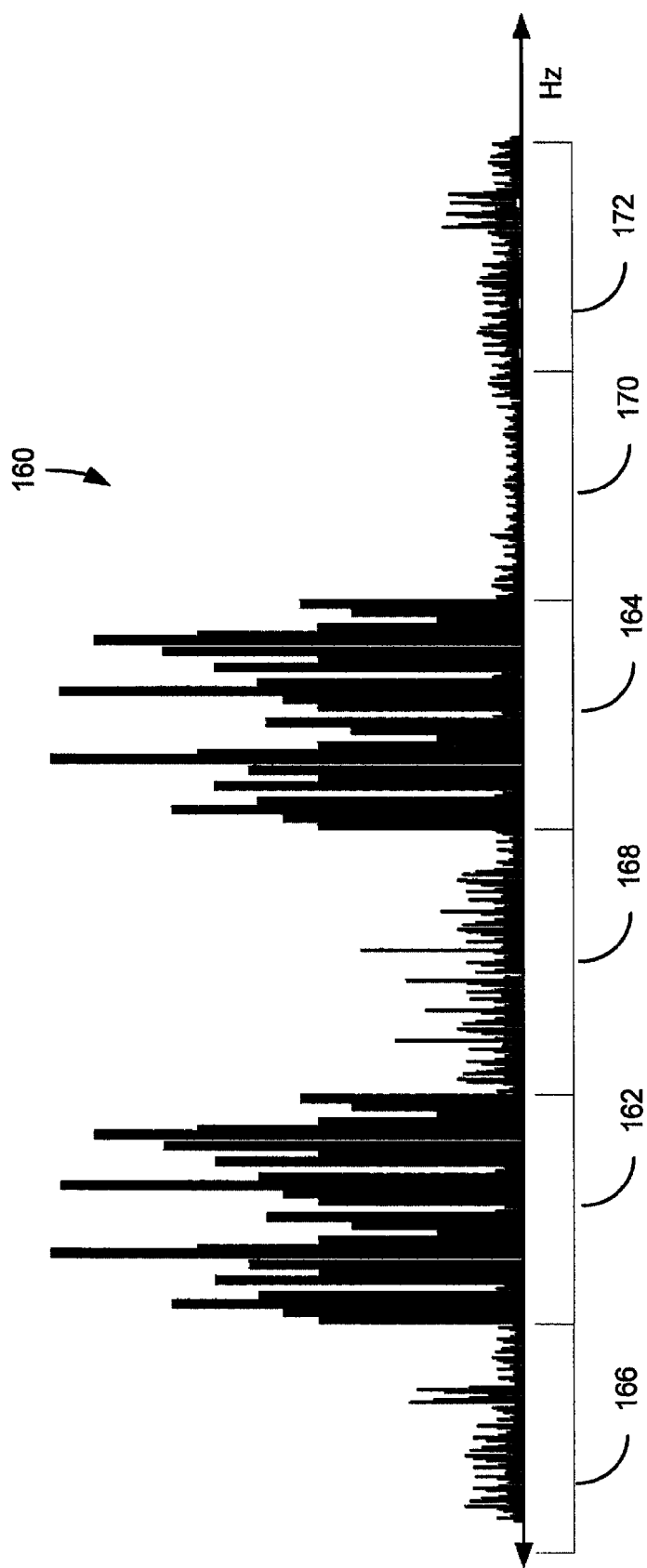
FIG. 1B is a schematic illustration of a portion of a licensed spectrum, including white space.

Techniques by which location information may be processed to identify channels is illustrated in FIG. 1B. A graph of signal power versus frequency illustrating an exemplary spectrum utilization is shown in FIG. 1B. Graph 160 shows values of energy associated with each signal frequency included in a portion of a licensed spectrum. Across the spectrum there may be some amount of "noise" in the un-used portions of the spectrum. A signal may also include data transmitted on various channels, and graph 160 shows such signals by showing larger energy levels in the frequencies that are in use. Graph 160 shows two such regions 162 and 164, which may represent channels that have been assigned to licensed users. In the context of FIG. 1A, regions 162 and 164 may constitute channels that are assigned in the spectrum illustrated in graph 160. Other channels, which are not assigned, may constitute white space in the spectrum. In the example of FIG. 1B, channels 166, 168, 170 and 172 may constitute white space, because they are not assigned to a licensed user of the spectrum.

Regulatory authorities, such as the Federal Communications Commission (FCC), that are responsible for assigning channels in a licenses spectrum may maintain information about channels in a licensed spectrum that have been assigned to licensed users. Conversely, information may be maintained about channels that are unassigned and therefore white space. These channel assignments are geographic, meaning that a channel assigned to a licensed user in one city or other geographic area may be assigned to a different user or unassigned in another geographic area. Accordingly, a substantial amount of information may be maintained about channel assignments, and that information may be indexed by location. This information may be stored in a regulatory database, such as a database associated with a server 120 in the example of FIG. 1A. Though, regardless of how the information is stored and indexed, this information may be the basis for a wireless device selecting a white space channel to use in its location.

For example, a wireless device operating in a location at which graph 160 represents actual usage of the wireless spectrum may consult the regulatory information and determine that channels 166, 168, 170 and 172 are white space, available for unlicensed wireless communication. In scenarios in which multiple white space channels are available, a wireless device may employ a suitable mechanism to select among the available white space channels. In some embodiments, the selection may be made randomly.

However, in other embodiments, the selection may be made based on dynamically determined characteristics such that higher quality wireless communications may be performed. FIG. 1B illustrates some criteria that may be used to select a channel when multiple white space channels are available in a location. Any of the devices selecting a channel may apply these criteria. In the example of FIG. 1A, selection criteria may be applied, for example, by cellular telephone 140, by processing components associated with access point 152 and/or a combination of the two. Alternatively or additionally, wireless computing device 130 may in whole or in part make the selection as part of a negotiation of a frequency channel with access point 152.

Regardless of which device or devices select from among the available white space channels, FIG. 1B illustrates parameters that may be used to select among white space channels. These parameters may relate to the frequency of the channel, the relationship of the white space channel to other assigned channels and/or detected signal characteristics, such as noise or signal to noise ratio, in the white space channel. As a specific example, for frequencies in the digital television spectrum, lower frequencies may provide more desirable propagation characteristics. For example, signals in lower frequency channels may more reliably propagate through walls and therefore may be more desirable for use in an office setting than channels at higher frequencies. Accordingly, a device selecting from multiple white space channels may prioritize channel 166 over channels 168, 170 or 172 because channel 166 occupies a lower frequency.

Other parameters may be used instead of or in addition to channel frequency for selecting among available white space channels. For example, FIG. 1B illustrates that some white space channels are adjacent to assigned channels. For example, channels 166 and 168 are adjacent assigned channel 162. White space channels 168 and 170 are adjacent assigned channel 164. White space channel 172, however, is not shown to be adjacent an assigned channel. In some scenarios, regulatory requirements may limit allowable transmit power in channels based on proximity to assigned channels. Such regulations may be made to limit interference between unlicensed communications and licensed users attempting to transmits signals in the licensed spectrum. For example, regulations may limit the maximum transmit power in white space channels 166, 168 and 170 at a level that is less than the maximum transmit power in white space channel 172. The limits in white space channels 166, 168 and 170 may be lower because those channels are adjacent licensed channels 162 or 164. Though, using a higher transmit power, such as may be possible if white space channel 172 is selected, may improve the signal to noise ratio of communications in white space channel 172, allowing data to be transmitted at a higher rate. Accordingly, in some embodiments, selection of a white space channel from among multiple white space channels may be based on allowable transmit power for the selected channel.

FIG. 1B illustrates a further parameter that may be the basis for a selection from among multiple white space channels in a location. FIG. 1B illustrates that though there are no licensed transmissions in white space channels 166, 168, 170 and 172, the energy levels in those channels vary. Energy in the white space channel may be the result of noise or may be the result of other unlicensed users. Regardless of the source, the energy level in a white space channel may dictate its suitability for use in data communications, such as between access point 152 and wireless computing device 130 (FIG. 1A). For example, FIG. 1B shows that white space channel 168 has a relatively high energy level. White space channels 166 and 172 also have energy levels that are above the energy level in white space channel 170. Accordingly, if detected energy level is used as a selection criteria, white space channel 170 may be selected because it has the lowest energy that may interfere with data communications.

It should be appreciated that FIG. 1B illustrates multiple criteria that may be used to select from multiple white space channels. These criteria may be used separately or in any suitable combination to select a specific white space channel in any scenario.

Figure 2:
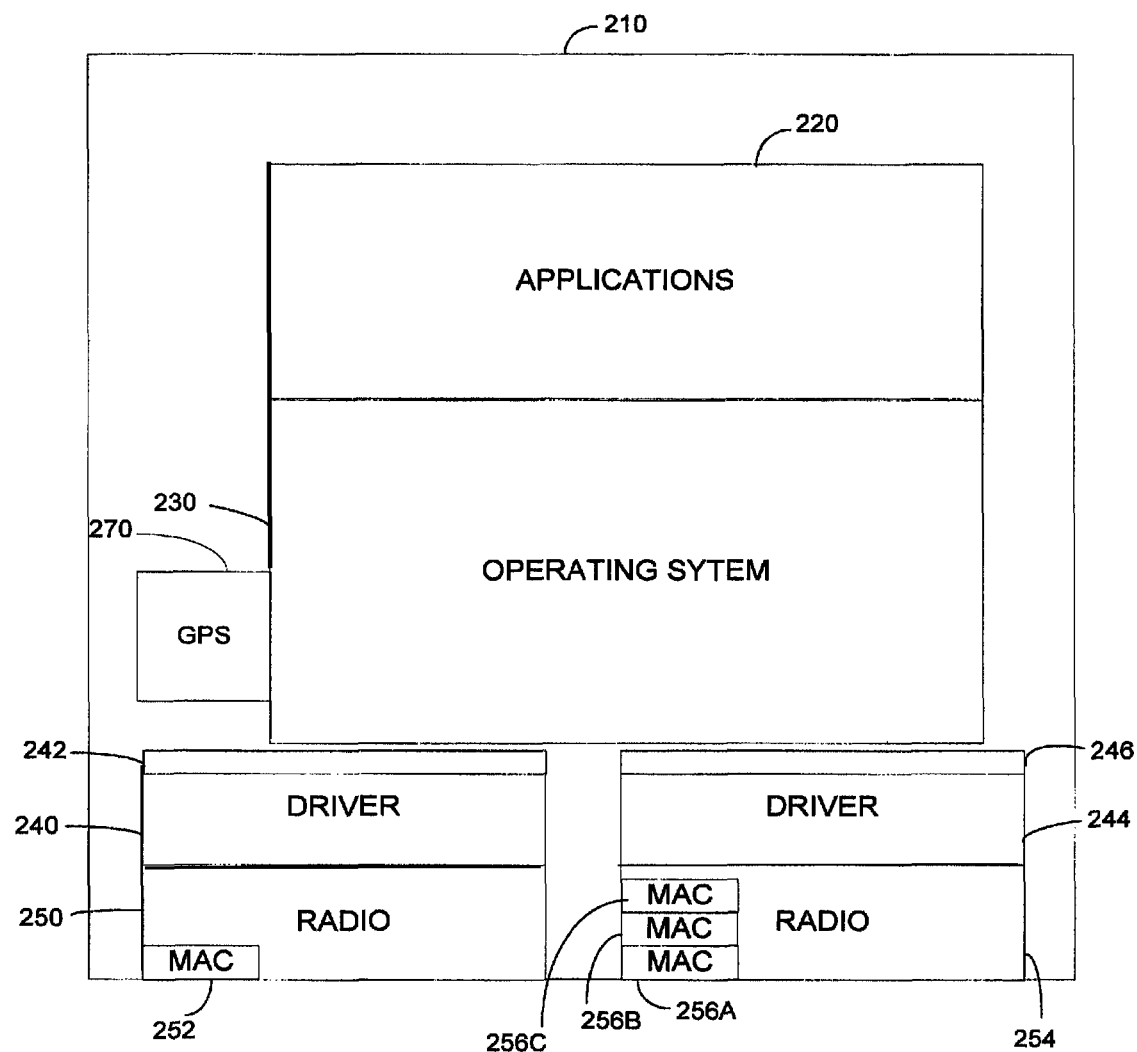
FIG. 2 is an architectural block diagram of a device including a component configured for cellular communication.

The operations of determining location, identifying white space channels in the identified location and selecting a white space channel for unlicensed wireless communication may be performed by any suitable device or devices. Such devices may include a cellular telephone, such as cellular telephone 140, an access point 152 or a wireless computing device 130 (FIG. 1A). However, the invention is not limited to devices of these types. Any suitable device may be used to perform any portion of the described operations. FIG. 2 represents generically a device that may perform some or all of the operations. In the example of FIG. 2, a computing device is illustrated. The computing device, for example could be wireless computing device 130. Though, it should be appreciated that conventional cellular telephones have computational capabilities. Accordingly, computing device 210 may represent cellular telephone 140 (FIG. 1A). Alternatively, computing device 210 may represent a conventional computer, such as a tablet configured to operate as an access point.

Regardless of the specific capabilities of computing device 210, FIG. 2 illustrates an embodiment in which the computing device 210 is configured for cellular communication.

FIG. 2 illustrates, at a high level, an architecture for computing device 210 that may be operated to perform functions associated with white space communication. In the example of FIG. 2, computing device 210 includes two radios, radio 250 and radio 254. Each of the radios may be adapted to send and receive wireless communications. Radio 250, for example, may be used for cellular communication. Radio 254, for example, may be used to form peer-to-peer connections.

In this example, radio 250 has a media access control (MAC) address 252. The MAC address may be a unique identifier associated with radio 250 such that it may be used to distinguish radio 250 from any other devices connected to a cellular network.

The MAC address for such a radio may be provided in a SIM card or personality module for the cellular network.

Radio 250 may be controlled through software, represented as driver 240 in FIG. 2. Here, driver 240 includes an interface 242 through which operating system 230 may issue commands to driver 240 and through which driver 240 may report status and notify operating system 230 of received data. Interface 242 may be implemented in any suitable way, including according to a known standard. An example of such a known standard is called NDIS, but that standard is not critical to the invention.

Interface 242 may support a number of commands in a format that does not depend on the construction of radio 250. Rather, driver 240 may translate the commands, in the standardized format of interface 242, into specific control signals that are applied to radio 250. For example, interface 242 may receive instructions to access a source of regulatory information relating to white space in a particular location. In the embodiment illustrated in FIG. 1A, such access may be made over the data network portion of a cellular network. Such a network may be implemented using known techniques. Accordingly, interface 242 may be a conventional interface. Though, the specific format of interface 242 is not critical to the invention.

Though driver 240, and in some instances radio 250, may automatically perform low level functions associated with cellular communication, higher level functions may be performed under control of operating system 230 or applications 220. FIG. 2 shows that device 210 also includes applications 220. In an embodiment in which computing device 210 determines a location and generates white space information based on the determined location, one or more of the applications 220 may perform functions associated with obtaining information for white space communication. For example, an application 220 may be programmed to determine the location of computing device 210. In the example of FIG. 2, computing device 210 includes a GPS component, which may determine a location of computing device 210 using a global positioning system.

However, an application 220 may be configured to determine location in any one or more ways. For example, as described above in connection with FIG. 1A, a device including a component configured for cellular communication my determine a location based on a triangulation technique using communications with multiple cellular base stations. An application 220 may be configured to control radio 250 to engage in communications with cellular based stations by which information useful in triangulating the location of computing device 210 may be collected.

The same or other applications 220 may control other aspects of white space communication. For example, application 220 may be configured to use location information to obtain white space information from a source of regulatory information, such as a regulatory database. Alternatively or additionally, an application 220 may, in scenarios in which there are multiple white space channels, prioritize the white space channels and/or select a white space channel for communication. As yet another example, application 220 may control interactions with another wireless device seeking white space information. For supporting communication with other wireless devices, computing device 210 may be configured to support wireless communications using technologies other than cellular communication.

In the embodiment illustrated in FIG. 2, computing device 210 also includes a radio 254. Radio 254 may be used to form one or more peer-to-peer connections. Radio 254 is incorporated into computing device 210 with generally the same architecture as radio 250. Though, it should appreciated that there is no requirement that radios 250 and 254 share a common architecture. Radio 254 is associated with a driver 244 that provides a mechanism for operating system 230 to control radio 254. Driver 244 has an interface 246 through which operating system 230 may send commands to driver 244 and driver 244 may provide status to operating system 230. Interface 246, like interface 242, may be a standardized interface such that operating system 230 may communicate with driver 244 using a known set of commands. Though, because radio 254 is used to implement peer-to-peer connections, driver 244 may respond to different or additional commands than driver 240 in order to implement functions associated with peer-to-peer communications that do not exist for cellular communications.

As an additional difference between radios 250 and 254, radio 254 is illustrated as having multiple MAC addresses. Here, MAC addresses 256A, 256B and 256C are illustrated. Multiple MAC addresses, for example, may be assigned by a manufacturer of radio 254 or the MAC addresses may be assigned in any suitable way, including as described above in connection MAC address 252. Alternatively, one or more of the MAC addresses may be assigned based on an identifier of the user of computing device 210.

Having multiple MAC addresses allows radio 254 to appear to devices external to computing device 210 as multiple entities, each with a separate MAC address. As an example, if computing device 210 is separately communicating as a group owner in a first peer-to-peer group and as a client in a second peer-to-peer group, separate entities may be established for the group owner and the client. Devices external to computing device 210 may address packets intended to be processed by computing device 210 as a group owner in the first group with a first MAC address. Packets intended to be processed as a client in the second group may be addressed with a second MAC address. Similarly, computing device 210 may insert the first MAC address in packets coming from the group owner; packets from the client may include the second MAC address.

To allow operating system 230 to associate its interactions with driver 244 with a specific one of those entities, internal to computing device 210, each of the entities may be represented as a port. Accordingly, operating system 230 may send commands to or receive status information from each such entity through a port associated with that entity.

Each of the ports may be configured to perform functions appropriate for the type of entity the port represents. An embodiment in which computing device 210 operates according to a Wi-Fi Direct, which is used herein as an example of a peer-to-peer protocol, a device that is part of a peer-to-peer group may take on a role of a group owner or a client. A group owner may be required in accordance with a wireless protocol to send certain types of action frames and respond to other types of action frames in specified ways. A device configured as a client may send different action frames and responses or may send the same action frames and responses in different contexts.

Though, it should be appreciated that a group owner and a client are just two examples of the roles that radio 254 and driver 244 may be configured to perform. As another example, an entity may be configured as neither a group owner nor a client. Rather, an entity may be assigned a role as a controller that manages interactions with other devices to form a group and determine the role of computing device 210 in that group.

Figure 3:
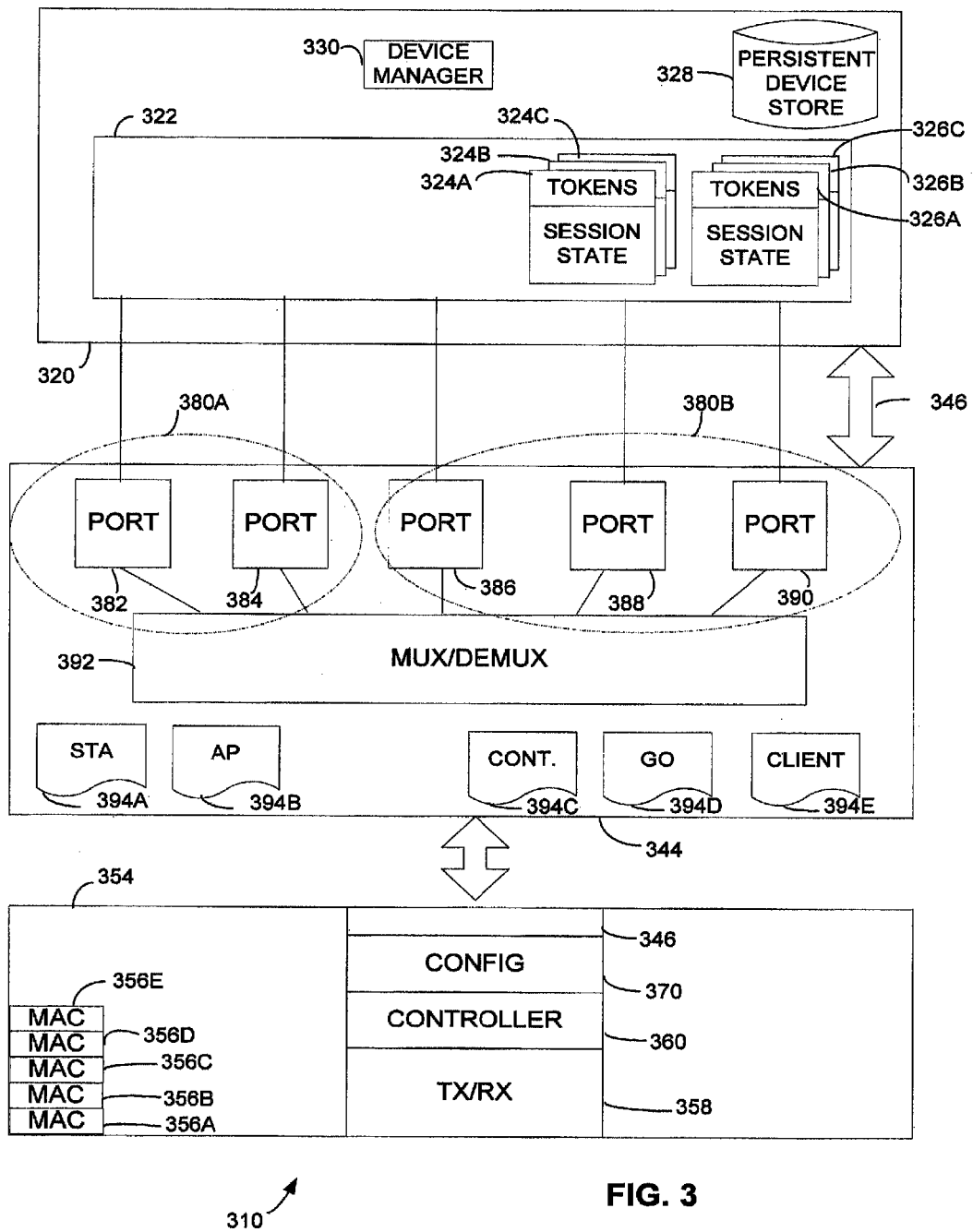
FIG. 3 is an architectural block diagram of a device configured for wireless communication.

FIG. 3 illustrates an embodiment in which a computing device 310 is configured to support wireless communications between computing devices. In some embodiments, these communications may be in accordance with a Wi-Fi protocol. As is known, Wi-Fi protocols may be both infrastructure mode and peer-to-peer. For example, access point 152 (FIG. 1A) may communicate with wireless computing device 130 using a infrastructure mode Wi-Fi protocol. Though, the same hardware components that implement access point 152 may communicate using a peer-to-peer protocol. As a specific example, communications between access point 152 and cellular telephone 140 may be based on a Wi-Fi Direct peer-to-peer protocol. FIG. 3 provides an example of a computing device that may be configured to operate in any of multiple roles, including as an access point or a client in a peer-to-peer communication session. In this example, both types of communication are performed with a single radio.

FIG. 3 illustrates computing device 310 containing a radio 354. Radio 354 is illustrated as having multiple MAC addresses, illustrated as MAC addresses 356A, 356B, 356C, 356D and 356E. Though five MAC addresses are illustrated, which may allow radio 354 and its associated driver 344 to concurrently provide five ports, it should be appreciated that the specific number of MAC addresses supported is not critical to the invention and more or less than five MAC addresses may be used in some embodiments.

In this example, the five MAC addresses may be used to provide five ports 382, 384, 386, 388 and 390, each configured to perform a different role. In the scenario illustrated, a group 380A of these ports has been configured to implement entities used for infrastructure based communications. Group 380B contains ports configured for peer-to-peer communications.

In the example illustrated in FIG. 3, group 380A contains two ports, ports 382 and 384. Group 380B is shown containing three ports, ports 386, 388 and 390. It should be appreciated that the number of ports allocated for each type of use is not critical to the invention and any suitable number may be used. Moreover, it is not a requirement that the number of ports in each group remain static. Rather, operating system 320 may issue commands to driver 344 to dynamically create or break down ports as needed.

In conjunction with a command to create a port, operating system 320 may specify a role associated with that port. Driver 344 may respond to such a command by creating a port configured for a designated role, which may be associated with infrastructure-based communications or with peer-to-peer communications. Though operating system 230 may specify a role, the role specified may be determined in any suitable way. For example, when forming a peer-to-peer group, operating system 320 may determine the role by controlling computing device 310 to wirelessly exchange messages with other devices in the group to collectively negotiate a role for each device.

Though any suitable mechanism may be used to implement a capability to assign a role to computing device 310, FIG. 3 illustrates an interface 346 between operating system 320 and driver 344. Interface 346 may be an interface to a driver in a standardized format. As one example, some drivers are written in accordance with the NDIS interface specification. In accordance with that specification, commands and status information may be exchanged between driver 344 and operating system 320 using programming objects called OIDs. The NDIS standard defines a number of OIDs that drivers should or may respond to. The standard, though, is extensible such that OIDs may be defined to support additional functionality in certain circumstances. This extensibility may be used to define commands, using OIDs or other suitable representation, that allows operating system 320 to command driver 344 to create or break down a port or to configure a port for a specific role.

Though radio 354 can process packets for multiple ports, other than supporting multiple MAC addresses, radio 354, in some embodiments, need not be specially configured for supporting ports. Radio 354 may be implemented using techniques as are known in the art. In this example, transmitter/receiver section 358 may be a hardware component as is known in the art and used for wireless communications. In this example in which radio 354 is being used to support communications in accordance with the Wi-Fi infrastructure-mode protocol and the Wi-Fi direct protocol for peer-to-peer communications, transmitter/receiver section 358 may support communications in multiple sub channels over a frequency range defined by the Wi-Fi specification. Though, the specific operating characteristics of transmitter/receiver section 358 may vary depending on the specific protocol implemented for communication and are not critical to the invention. However, in accordance with some embodiments, transmitter/receiver section 358 may be capable of transmitting and receiving frequencies in the digital T.V. spectrum in addition to frequencies in the ISM spectrum conventionally used for wireless communications between computing devices. Likewise, controller 360 may be a hardware component as is known in the art of wireless radio design. Though, controller 360 may be adapted to receive commands specifying channels in a licensed spectrum that are white space and therefore are available for use. Additionally, in some embodiments, controller 360 may be adapted to receive commands specifying parameters of use of a white space channel, such as a maximum transmit power. Similarly, configuration register

370 may be a hardware component as is known in the art of wireless radio design. The components indicated as MAC address 356A . . . 356E may also be implemented using techniques as are known in the art. In some embodiments, the MAC addresses supported by radio 354 may be encoded in a read only memory or other component that is a portion of radio 354. Though, it should be appreciated that, in embodiments in which MAC addresses are assigned to radio 354 through driver 344, MAC addresses 356A . . . 356E may be physically implemented in either volatile or non-volatile rewriteable memory such that the pool of MAC addresses to which radio 354 can respond may be dynamically created.

Regardless of the manner in which the components of radio 354 are implemented, radio 354 may contain a hardware interface 346 through which driver 344 may control radio 354. In some embodiments, driver 344 may be computer executable software instructions executing on a processor within computing device 310. Accordingly, hardware interface 346 may be implemented as a bus connection or other suitable interconnection between the processor executing driver 344 and a separate card holding radio 354. Though such hardware interfaces are known in the art, any suitable interface may be used.

To configure radio 354 to support a port, driver 344 may configure radio 354 to process packets for a specific MAC address associated with communications through that port. Driver 344 may write a value into configuration register 370 indicating that a MAC address should be activated such that radio 354 will process received packets identified with that MAC address. In operation, controller 360 may control transmitter/receiver section 358 to respond to any packets identified with a MAC address identified as active by information in configuration register 370. Accordingly, if multiple ports are active, configuration register 370 will contain an indication of each of the active MAC addresses.

In addition to configuring radio 354 to respond to a MAC address for a port, driver 344 may specify communications parameters to be used with that MAC address. These parameters may specify, for example, that a different number of sub channels may be used for communication with different MAC addresses. In this way, communication characteristics of different ports may be controlled based on the role associated with the port. As a specific example, a port configured as a control port may require lower bandwidth than a port for communicating data. Accordingly, radio 354 may be configured to use fewer sub channels or a different encoding scheme for a MAC address that is associated with a control port.

For information to be transmitted, driver 344 and/or radio 354 may be operated such that any frames transmitted containing such information will be identified by the MAC address associated with the port for which the information is being transmitted. Any suitable mechanism may be used to associate MAC addresses with specific frames sent from or received for a specific port. Moreover, this processing may be performed partially or totally within driver 344 and partially or totally within radio 354 because the specific implementation does not impact functioning of the ports.

To implement multiple ports, driver 344 may also be configured. In this example, driver 344 is illustrated to contain computer executable instructions that implement a multiplexer/demultiplexer 392. Multiplexer/demultiplexer 392 operates to route received packets associated with a port to a portion of driver 344 that implements the functionality of the respective port. Conversely, multiplexer/demultiplexer 392 receives packets for transmission from any of the ports and routes those packets to radio 354.

In scenarios in which multiple ports simultaneously have information for transmission, multiplexer/demultiplexer 392 may mediate to establish the order in which radio 354 receives information from the ports. For this purpose, multiplexer/demultiplexer 392 may use any suitable policy. For example, packets carrying action frames may be given priority over packets with data frames. As another example of a policy, transmissions associated with ports operating in infrastructure mode may be given priority over ports operating in peer-to-peer mode. As yet another example, a port configured for the role of group owner may be given priority over a port configured for the role of client in a peer-to-peer group. Though, the specific policies applied by multiplexer/demultiplexer 392 are not critical to the invention, and any suitable policies may be employed.

In addition to configuring multiplexer/demultiplexer 392 to route packets, driver 344 may be configured by associating specific functional modules with each of the ports. The specific functional module associated with the port may be based on the role assigned to that port. For example, FIG. 3 illustrates five functional modules. Functional module 394A, when associated with a port, may configure that port to operate in the role of a station in an infrastructure network. Similarly, functional module 394B, when associated with a port, may configure that port for the role of an access point in an infrastructure network. Functional module 394C, when associated with a port, may configure that port for operating in the role of a controller in peer-to-peer mode. The controller, for example, may control communications as the device negotiates or renegotiates a role in a peer-to-peer group. Functional module 394D, when associated with a port, may configure that port for the role of group owner in a peer-to-peer group. Functional module 394E, when associated with a port, may configure that port for the role of client in a peer-to-peer group. Other functional modules, though not illustrated in FIG. 3, may alternatively or additionally be included.

Functional modules 394A . . . 394E may be implemented in any suitable way. For example, each of the functional modules may be implemented as a collection of computer executable instructions that are encoded to perform functions for the role associated with the functional module. For example, functional module 394A may be encoded with instructions that control radio 354 to transmit packets as appropriate for a station in an infrastructure network. Additionally, functional module 394A may contain instructions that allow driver 344 to interact with operating system 320 in a way that implements the behaviors of a station in an infrastructure network. As a specific example, functional module 394A may be encoded to automatically generate responses to certain received frames. Additionally, functional module 394A may be encoded to transfer data received in a frame to a location in memory on computing device 310 and then notify operating system 320 that data has been received. Further, functional module 394A may configure radio 354 for the role of that functional module. Such configuration may include setting a number of sub channels or other parameters of the wireless communications used in the specified role. The operations performed by functional module 394 may be similar to those performed in a conventional driver for a wireless network interface card configured only as a station in a Wi-Fi network, and functional module 394 may be encoded using techniques as are known in the art.

Each of the other functional modules may be similarly encoded to interact with the operating system 320 and radio 354 to configure radio 354 and to internally process and generate communications as appropriate for its respective role. Functional module 394B, for example, may be encoded with computer executable instructions that perform operations on or respond to received frames with behaviors as are known in the art for an access point in an infrastructure network. Also, functional module 394B may be encoded to interact with operating system 320 using techniques as are known in the art.

Functional module 394C may be encoded to perform functions associated with establishing a peer-to-peer group. The instructions that implement functional module 394C may likewise be written using techniques that are known in the art. Those instructions may cause radio 354 to transmit packets containing action frames or responses to action frames of the type used in establishing a group for peer-to-peer communication according to a specific protocol and that negotiate or renegotiate roles of devices for such a group. Components within operating system 320 may trigger the sending of those action frames. Though, for some action frames, functional module 394C may be configured to generate a response to an action frame without express action by operating system 320. Table 1 lists examples of action frames that functional module 394C may be commanded to send by operating system 320. These action frames represent action frames appropriate for a Wi-Fi Direct protocol. Additional action frames used in that protocol may be sent without an express command in response to a received action frame or other suitable trigger. Though, it should be appreciated that different or additional action frames may be used for different protocols, and the specific action frames is not a limitation on the invention.

TABLE I

| Action Frame | Dialog Token Generated by Driver | Port Remains Available After Successful Transmission For Receiving Replies | Receive Indicated to OS |
| --- | --- | --- | --- |
| GO Negotiation Request | Yes | Yes | Yes |
| GO Negotiation Response | No | Yes if the response indicates that the negotiations were successful, No Otherwise | Yes |
| GO Negotiation Confirmation | No | No | Yes |
| P2P Invitation Request | Yes | Yes | Yes |
| P2P Invitation Response | No | No | Yes |
| Provision Discovery Request | Yes | Yes | Yes |
| Provision Discovery Response | No | No | Yes |

When the operating system 320 submits a request to a control port to send one of the action frames in Table I, functional module 394C within driver 344 may take actions such as:

a. Select a dialog token for the transmission. If the send is in response to a request, the operating system may provide the dialog token (as described below) to be used, and driver 344 may then use the specified dialog token.

b. Complete the request. If driver 344 selected the dialog token, it may report the dialog token to the operating system 320 in the completion of the request.

c. Sync with the Wi-Fi Direct device to which the frame is targeted. Depending on the implementation, if the send is in response to a received request (e.g. Invitation Response sent on reception of an invitation request), this step may be omitted.

d. Send the frame & wait for an ACK.

e. Once the ACK for the frame is received or if none of the retry attempts get an ACK, send a NDIS_STATUS indication to operating system 320 to notify about the transmission status of the action frame. This indication may include the information elements from the packet containing the action frame.

If the send was for a frame that would receive a reply from the peer device and the transmission was successful, the port may remain available for the peer device to send reply action frames to the miniport. The timeout and mechanism of being available may follow the Wi-Fi Peer-To-Peer Technical Specification.

The specific component within operating system 320 that triggers functional module 394C to send action frames when functional module 394C is associated with a port is not critical to the invention. However, FIG. 3 illustrates a device manager 330 within operating system 320. Device manager 330, for example, may be a device manager as is known in the art that may present a user or programmatic interface through which a user or other executing component may request that a communication session be established with a device or a group of devices using peer-to-peer communication.

When a port, such as port 386, is configured to act as a controller for peer-to-peer communication by associating that port with functional module 394C, device manager 330 may interact with port 386 to control various aspects of establishing peer-to-peer communication with one or more devices. For example, device manager 330 may receive user input requesting that computing device 310 be wirelessly connected to a device. In response to such input, device manager 330 may interact through stack 322 with port 386, causing functional module 394C to control radio 354 to transmit action frames.

The transmitted action frames may be those associated with device or service discovery. Device manager 330 may specify the nature of those requests, such as whether functional module 394C should seek to discover any device in the vicinity of computing device 310 or only devices that provide an identified service, such as a printer service. Though, device manager 330 may be configured to send commands in other formats through port 386 to establish communication with one or more devices in a group.

As an example, FIG. 3 shows that operating system 320 maintains a persistent device store 328. Persistent device store 328 may contain information identifying devices with which computing device 310 has previously established wireless communication. Such information, for example, may constitute persistent group profiles, which may include an identifier used to signal a set of devices to concurrently re-form a group. Device manager 330 may access information in persistent device store 328 to identify specific devices and send commands through port 386 for functional module 394C to generate action frames to establish a wireless connection with a device identified in persistent device store 328. These actions may occur automatically, in response to user input or in response to any other suitable trigger.

In scenarios in which device manager 330 requires information, such as a password or identifier, to establish communication with an external device, device manager 330 may alternatively or additionally interact with a user through a user interface (not expressly shown in FIG. 3) to obtain that information from a user or some other source. That information, which, for example, may be obtained during pairing of computing device 310 to one or more remote devices, may be stored in persistent device store 328. In this way, information obtained from a user, such as during a pairing ceremony with a remote device need not be acquired from the user again to re-establish a peer-to-peer connection with the remote device. Rather, the information may be obtained from persistent device store 328. Though, regardless of the manner in which information input from a user is acquired, when that acquired information needs to be transmitted, device manager 330 may interact with the port configured as a controller to cause that information to be sent.

Regardless of the mechanism that triggers a port configured as a control port, such as port 386, to identify a group of devices, the control port may send and receive action frames to identify one or more devices that form a group including computing device 310. The actions initiated through port 386, in addition to identifying the group, may negotiate a role for computing device 310 within that group. In the illustrated example of the Wi-Fi Direct peer-to-peer protocol, a device may have a role in a group as the group owner or as a client. Communication with another device or devices in the identified group may be performed through a different port. That port may be configured to support behavior in the role identified for computing device 310.

In the example illustrated in FIG. 3, additional ports 388 and 390 are illustrated. Each of these ports may be associated with a different role. For example, port 388 may be associated with the role of group owner. Port 390 may be associated with the role of client. Configuring a port for a different role may be performed by associating the port with the functional module that performs operations associated with the role. For example, functional module 394D, which performs functions associated with a device operating as a group owner, may be associated with port 388. Likewise, functional module 394E, which performs functions associated with the device operating as a client, may be associated with port 390.

In operation, as packets are received through radio 354 having MAC addresses associated with ports 388 or 390, multiplexer/demultiplexer 392 will route those packets for processing within the associated port. Packets routed to port 388 may be processed by functional module 394D, which may perform actions associated with the role of a group owner. Packets containing data frames may be processed by placing the data in memory and notifying stack 322 that data has been received. Such an interaction with operating system 320 may use stack signaling techniques as are known in the art. Though the specific mechanism by which communication between each port and operating system 320 occurs is not critical to the invention.

When action frames are sent as part of a session established with a group in which computing device 310 is the group owner, those action frames may likewise be routed by multiplexer/demultiplexer 392 to port 388. Functional module 394C may be configured to either respond to those action frames or may be configured to report the action frames to operating system 320 depending on whether functional module 394C is programmed to respond to them.

Similarly, if computing device 310 is configured for the role of a client in a group, packets relating to communication with devices in that group will be identified with a MAC address that causes multiplexer/demultiplexer 392 to route those packets to a port configured as a client, such as port 390. Port 390 may be associated with functional module 394E, implementing functionality of a client according to a peer-to-peer protocol. Functional module 394E may be configured to transfer data from data frames in such packets to memory and notify operating system 320 of that data, using techniques as are known in the art. Functional module 394E may respond to packets containing action frames or may notify operating system 320 of those management frames.

Functional modules 394C, 394D and 394E may be coded to implement functions prescribed in accordance with a peer-to-peer protocol, such as Wi-Fi Direct protocol. Additionally, functions performed by a device operating in accordance with the peer-to-peer protocol may include detecting a remote device with which a persistent peer-to-peer group was previously formed. Upon detecting such a remote device, functions performed by the device may include establishing communication with that remote device based on previously stored persistent profile information. These functions may be implemented by appropriately configuring functional module 394C. Though, any suitable implementation may be used.

FIG. 3 illustrates a specific hierarchy of communication functions. Certain functions relating to communication with external devices are performed within radio 354. Other functions are performed within driver 344. Yet further functions are performed within operating system 320. Though not specifically illustrated, even further functions may be performed by applications 220 (FIG. 2) or by input from a user or source external to computing device 310. With such an architecture, higher level functions, such as determining which devices to connect to as part of a peer-to-peer group, may be performed at higher levels in the architecture. Conversely, lower level functions, such as generating an acknowledgement to a received packet may be performed at lower levels in the architecture. For example, driver 344 may be configured to generate such an acknowledgement. Any of the functions as described herein may be performed by components at any suitable level of the hierarchy.

Though other architectures are possible that may partition the functions differently so that different aspects of communication are controlled by different components, in the example illustrated, radio 354 and driver 344 are configured to respond statelessly to events, such as commands or received packets. To the extent state information is involved in a communication session, that state information may be maintained within operating system 320. For example, stack 322 may maintain state information for communication sessions carried on through any of the ports 382, 384, 386, 388 and 390. The specific state information maintained may depend on the number and types of states within a protocol supported by each of the ports.

In the example of FIG. 3, session state information 324A is shown associated with port 388. Though not expressly illustrated, session state information may be maintained for other ports. Depending on the protocol implemented by port 388, such session state information may indicate parameters of a session, such as a number of devices that are joined in a group for which computing device 310 is the group owner. Other state information, such as a time until those devices may enter a lower power mode, may also be stored as part of the session state information 324.

FIG. 3 additionally shows session state information 324B and 324C associated with port 388. State information 324B and 324C may describe different sessions. Such sessions may arise if computing device 310 is joined in three groups in which it is the group owner. To support multiple such sessions, a mechanism may be provided to associate specific frames sent or received with a corresponding session. Any suitable identifier or identifiers may be used. For example, communications with a group of devices may be regarded as a session, such that an identifier of a group may be used to aggregate related communications as part of a session. Stack 322 provides an interface to device manager 330 or other components that associates each session with the appropriate component that is an end point in that session. Such interfacing may be performed using techniques as are known in the art.

In addition to maintaining state information that allows communications from separate sessions to be presented appropriately, stack 322 may maintain, as part of the state information maintained for each session, information that allows stack 322 to relate communications that are part of an exchange of communications to perform a function. For example, when a frame, representing a request, is sent, recognizing that a subsequently received frame is a response to that request may facilitate processing of the request and response. Providing a mechanism to relate communications that are part of an exchange may facilitate processing, particularly if multiple sessions are supported on the same port. To enable recognition of communications that are part of an exchange, "dialog tokens" may be used. A communication initiating an exchange may be tagged with such a dialog token. Upon responding to such a communication, the dialog token from the request may be copied to the response. Accordingly, a device sending a request may associate a response, or any other communication that is part of the same exchange, with the request. Accordingly, state information 324A may contain dialog tokens associated with ongoing communications involving any device communicating as part of the session.

Dialog tokens may be generated in any suitable way. They may be generated, for example, within the operating system 320. Alternatively, if a packet beginning a dialog is initiated in a port, the port or other component within driver 344 may generate the token. Similarly, if a reply to a packet is generated within a port, such as port 386, 388 or 390, the token may be inserted in the reply by that port. Conversely, if a reply to a packet is initiated in response to a command generated within operating system 320, a component within operating system 320, such as stack 322 may specify the token for inclusion in the reply. Table I indicates, for the listed action frames, whether the dialog token associated with an action frame is generated in the operating system or, if not, in the driver. Though, it should be appreciated that Table I represents only one example of how the functionality of generating a dialog token for a frame may be partitioned, and any suitable partitioning of that function may be used.

Similar session state information 326A, 326B and 326C is shown in connection with port 390. Session state information 326A, 326B and 326C may represent state maintained for each of three sessions, with each session being associated with a group in which computing device 310 is a member with the role of client. As with session state information 324A, 324B and 324C a unique dialog token may be associated with each of the sessions, allowing stack 322 to separate received packets associated with each of the sessions. Likewise, computing device 310 may cause a dialog token to be associated with packets transmitted from computing device 310. The dialog tokens may be used to allow stack 322, or similar processing components on remote devices that receive packets from computing device 310, to associate packets that are part of a multi-packet exchange of information. For example, a second packet sent in reply to a first packet may include the token from the first packet. As a result, when the sender of the first packet receives the second packet, it can associate the first packet and second packet with the same dialog.

With the architecture illustrated in FIG. 3, state information concerning each of the connections may be maintained within operating system 320. As a result, the ports 386, 388 and 390 need not maintain state information. In some embodiments, functional modules, such as functional modules 394C, 394D and 394E that implement the functions of a port do not maintain state information. Rather, each of the functional modules may be encoded to respond to events, such as a command from operating system 320 or a received packet passed on by radio 354. Though, regardless of how this functionality is partitioned, computing device 310 may be controlled to supply functionality associated with multiple entities by establishing and configuring a port to perform the functionality of each entity. As a result, computing device 310, because driver 344 and radio 354 may be configured to support multiple ports, may concurrently operate as different entities. These entities may include entities associated with infrastructure mode communication as well as entity associated with peer-to peer communication.

Regardless of the specific architecture of a wireless device, the wireless device may be configured to interact with a cellular component to receive white space information. Using this white space information, the wireless device may establish communications with one or more other wireless devices in a white space channel in a way that meets regulatory requirements.

It should be appreciated that FIG. 3 is an example of an architecture of a wireless device that may be used in connection with techniques supporting white space communication. Such a wireless device may have capabilities to perform many functions in addition to communication. The device, for example, may include components for controlling a device, such as television 150 (FIG. 1A). In conjunction with that capability, the device may receive streams of data representing audio video content for display on computing device 150. Streaming of audio video content may be performed using a white space channel. Though, it should be appreciated that streaming of audio video content is just one example of use of a white space channel and that embodiments of a white space communication system is described herein may communicate data for any suitable purpose.

Figure 4:
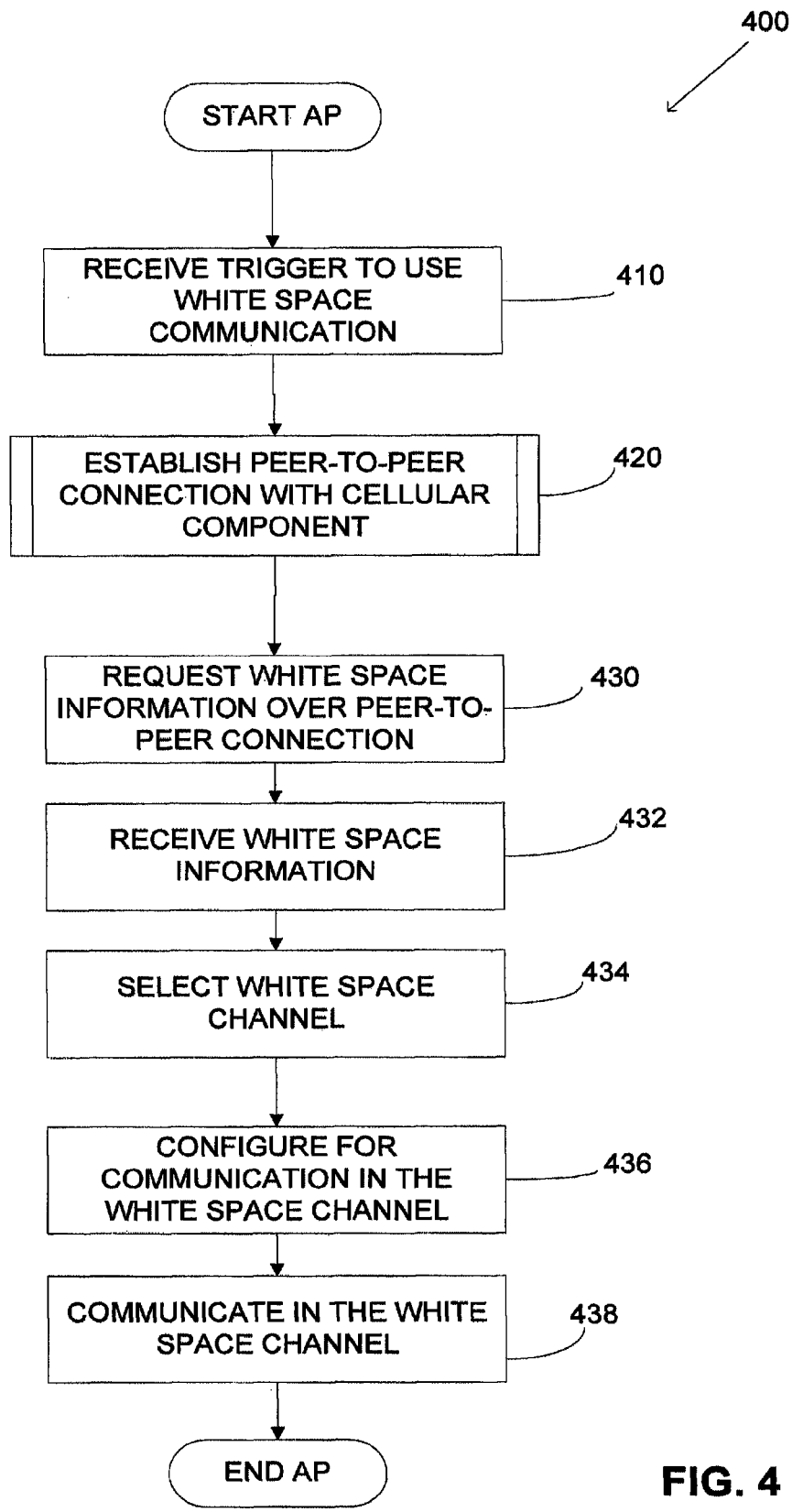
FIG. 4 is a flowchart of a method of operating a wireless device that receives white space information and uses that information to establish communication in a white space channel.

FIG. 4 illustrates a method of operating such a wireless device to communicate in a white space channel.

Any suitable component within a wireless device may be configured to control the wireless device to obtain an use such white space information. FIG. 4 illustrates a method 400 by which such a wireless device may operate. The wireless device may be controlled to perform method 400 by any suitable component, such as device manager 330 (FIG. 3).

Regardless of the specific component that controls the wireless device to perform a method 400, the method may begin at block 410 where the wireless device receives a trigger to use white space communication. Any suitable event may serve as a trigger to use white space communication. The trigger, for example, may be express user input. Alternatively, or additionally, the trigger may be a detected operating condition indicating enhanced performance of the wireless device through use of white space communication. Such a trigger, for example, may arise if the wireless device is unable to establish a connection using the ISM band or other conventional frequency band. Alternatively or additionally, the trigger may be detection of high signal energy in other bands. As yet another example, the wireless device may be preprogrammed to use a white space channel, if available, for certain types of communications, such as streaming of multimedia information.

Regardless of the specific event constituting a trigger detected at block 410, method 400 may proceed to sub-process 420 where the wireless device establishes communication with a component configured for cellular communication. In the embodiment illustrated in FIG. 1A, the component configured for cellular communication is cellular telephone 140. In that example, the wireless device communicates with the cellular component using a peer-to-peer connection in an unlicensed frequency band, such as the ISM band. Accordingly, method 400 includes a sub-process 420 which, in the example illustrated, involves establishing a peer-to-peer connection with the cellular component.

Sub-process 420 may be performed in any suitable way, including through the use of techniques as are known in the art for establishing peer-to-peer connections. In this example, the wireless device may perform the role of a group owner in a Wi-Fi Direct connection that invites the cellular component to join a group as a client. Though, the specific role that each device plays in the connection is not critical to the invention.

Regardless of the specific mechanism by which a connection is established and the nature of that connection, the method 400 may proceed to block 430 where the wireless device communicates over that connection. In the example of FIG. 4, the wireless device sends a request over the peer-to-peer connection at block 430. That request may be formatted in any suitable way. In some embodiments, the cellular component, such as cellular telephone 140 (FIG. 1A) may support an interface through which white space information can be requested. In such embodiments, the request sent at block 430 may be directed to such an interface.

A request sent at block 430 may include one or more parameters. For example, the request may include a parameter indicating the format of the information to be provided or scenarios under which white space information is to be provided or updated. For example, the request may be a one time request for information. Alternatively, the request may be in the form of a registration with a service on the component configured for cellular communication through which updated location information is provided to the wireless device periodically or in response to a change in location of the cellular component that could impact an appropriate selection of white space. As further examples of variations in the nature of the request, the request may indicate that white space information is to be provided in the form of a location, which the wireless device may use to obtain available white space channels. Alternatively, the request may signify that the white space information is to be formatted as an identification of white space channels available for use in the location. As yet a further example, the request may indicate that the white space information is to be provided in connection with reliability information, indicating whether the white space information has been determined based on a location that is accurate enough to satisfy regulatory requirements. Alternatively, the request may indicate that white space information is to be provided only if it is based on location information accurate enough to satisfy regulatory requirements.

Any suitable format may be used to signify one or more of the foregoing options. Moreover, it should be appreciated that the options described above for the embodiment of FIG. 4, in other embodiments, may be preselected such that, without any express indication in the request transmitted at block 430, the cellular component responds with white space information in scenarios or with a format in accordance with any one or more of the options described above.

Regardless of the specific format of the request, the component configured for cellular communication may respond with white space information. The wireless device may receive this white space information at block 432.

At block 434, the wireless device may use the white space information to select a white space channel. The specific actions performed at block 434 to select a white space channel may depend on the nature of the white space information and/or the functions of the wireless device. For example, in embodiments in which the white space information directly indicates available channels, processing at block 434 may include selecting a channel from a list provided with the white space information received at block 432. If the list is prioritized, the selection at block 434 may entail selecting the highest priority channel in the list that the wireless device and a remote wireless device with which communication is to be established are jointly capable of using. Though, in some embodiments, additional processing may be performed, and that processing may depend on the techniques by the cellular component to prioritize the list. For example, in some embodiments, a wireless a device receiving a prioritized list may sense signal levels in the identified channels to select from among the list an unused channel.

In other embodiments, such as when the white space information received at block 432 identifies a location, selecting a white space channel at block 434 may entail accessing regulatory information to determine white space channels in the identified location. Regulatory information may be accessed in any suitable way. In some embodiments, processing at block 434 may entail directly or indirectly accessing a regulatory database. In some embodiments, the regulatory database may be accessed over wide area network connection after the location information is received at block 432. Though, there is no requirement that the regulatory database be accessed after the white space information is received. As embodiment, the wireless device may download an cache portions of a regulatory database such that accessing a regulatory database at block 434 can be based on previously downloaded information. As yet another example of a further variation, the white space database may be accessed indirectly by communicating with one or more intermediary devices that have or have had access to a regulatory database.

Regardless of the manner in which a white space channel or channels is selected at block 434, method 400 may proceed to block 436 where the wireless device may be configured for communication in the selected white space channel. Processing at block 436 may entail configuring communications hardware for transmitting and/or receiving on the selected white space channel. When the wireless device has an architecture such as is illustrated in FIG. 3, configuration may entail writing information into a configuration register 370 (FIG. 3), specifying the selected white space channel or channels. Though, it should be appreciated that configuring a wireless device for communication in a white space channel may be performed in any suitable way, including using techniques as are known in the art.

Moreover, it should be appreciated that the actions of selecting the white space channel and configuring the wireless device for communication in the selected white space channel are shown in FIG. 4 as separate acts for simplicity of illustration only. In some embodiments, the selecting and configuration may be performed in a combined operation. For example, the available white space channels may be added to a list of channels that communications hardware within the wireless device will use in establishing a wireless connection to one or more remote wireless devices. The wireless device and remote wireless device may undergo a negotiation process by which they mutually arrive at a channel from mutually supported channels. Such negotiations are known in the art of wireless communications protocols, and such negotiation may be performed using known techniques or in any other suitable way. Regardless, the negotiation may result in selection of specific channel on which the wireless communications hardware of the wireless device may be configured to operate.

Accordingly, the method 400 may proceed to block 438. At block 438, the wireless device may communicate in the white space channel. Communication in the white space channel may involve sending and/or receiving messages of any suitable type. In the embodiment of FIG. 1A, the remote wireless device may be portable computing device 130 and the communications may entail information to be displayed on television 150. Though, processing at block 438 may entail any suitable types of communications.

Figure 5:
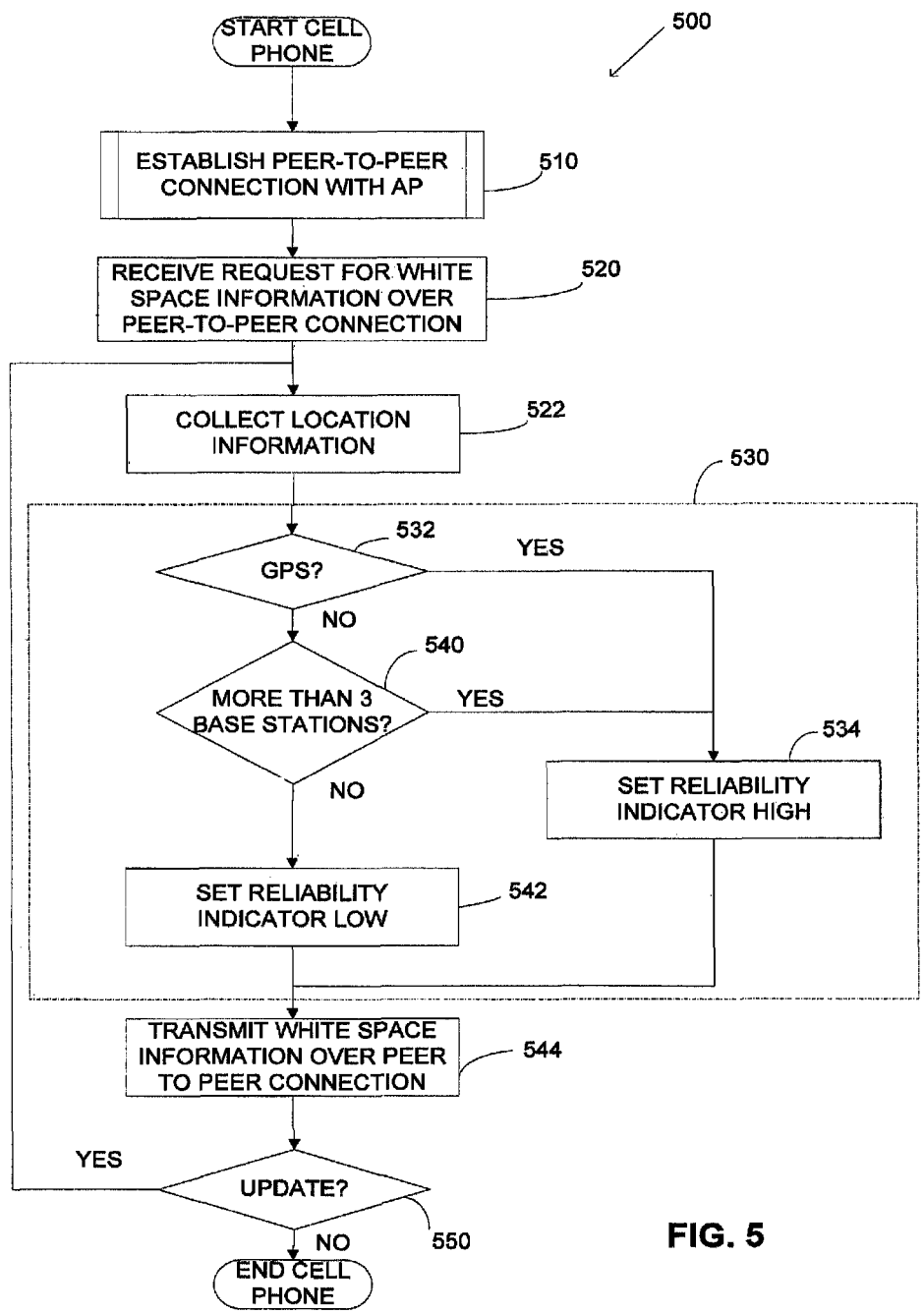
FIG. 5 is a flowchart of a method of operating a device including a component configured for cellular communication that generates white space information.

Method 400 may be performed by any suitable type of wireless device. Moreover, method 400 may entail communication with any suitable cellular component. FIG. 5 provides an example of a method 500 that may be performed by such a cellular component. In this example, the method 500 may be performed by a device such as cellular telephone 140 (FIG. 1A) or other suitable device configured for cellular communication.

In some embodiment, the device may be a portable electronic device such that it can be carried by a user into the vicinity of a wireless device that may seek white space information. Such a device also may have processing capability such as is illustrated by the architecture of FIG. 2. However, any suitable device may be programmed or otherwise configured to perform the method 500.

In the example illustrated, the method 500 begins at sub-process 510. In sub-process 510 the cellular telephone performing the method 500 establishes a peer-to-peer connection with a wireless device seeking white space information. In this example, the cellular telephone performing the method 500 may interact with a wireless device serving as an access point performing the method 400. In such an embodiment, method 510 may entail sending and receiving communications that correspond to communications sent and received by the access point as part of sub-process 420. In this example, performing sub-process 510 may result in the cellular telephone being configured for peer-to-peer communication with the device acting as an access point. As a specific example, in the scenario in which the access point, as a result of performing sub-process 420, is considered as a group owner of a peer-to-peer group, the cellular telephone performing method 500 may, as a result of executing sub-process 510, be configured as a client. Though, it should be recognized that the specific protocol, and the roles performed by each of the devices in that protocol, is not critical to the invention.

Regardless of the manner in which a connection is established at sub-process 510, method 500 may proceed to block 520. At block 520, the cellular telephone performing method 500 may receive a request for white space information over the peer-to-peer connection. As described in connection with FIG. 2, such a request may be processed by an application 220 programmed on the cellular telephone. Though, the processing at block 520, and the subsequent steps of method 500, may be performed by an suitable component within the cellular telephone.

Regardless of the specific component receiving the request at block 520, method 500 may proceed with the cellular telephone responding to the request. In the example illustrated in FIG. 5, method 500 proceeds with the cellular telephone obtaining location information at block 522. Processing at block 522 may be performed in any suitable way and may include collecting location information using one or more techniques. If multiple techniques are employed, the determined location may depend on a combination of locations determined using different techniques. In some scenarios, the location information may be determined using the technique deemed to be most accurate. In other embodiments, location information derived using multiple techniques may be aggregated as a way to increase the accuracy of the information. In embodiments described above, location information was collected by reading a GPS hardware, if available, or through communications with one or more base stations that could be processed using triangulation techniques to determine the location of the cellular telephone. Though, it should be appreciated that these examples are illustrative rather than an exhaustive list of possible techniques.

Following processing at block 522 to obtain location information, a sub-process 530 may be performed in which a reliability indicator is generated for the information collected at block 522. Any suitable processing may be used to determine the reliability of the information. However, in the example illustrated in FIG. 5 sub-process 530 begins at decision block 532. At decision block 532, sub-process 530 branches, depending on whether the location information collected at block 522 was based on GPS data. If so, sub-process 530 branches to block 534 where a reliability indicator associated with the location information is set to high.

Conversely, if the location information was not obtained from a GPS component, sub-process 530 branches from decision block 532 to decision block 540. At decision block 540, sub-process 530 again branches. In this case, sub-process 530 branches at decision block 540 depending on the whether the location information collected at block 522 was obtained using a triangulation technique when more than three base stations were available to provide position information about the base stations and range information. If communication with more than three base stations was available, sub-process 530 branches from decision block 540 to block 534. As described above, at block 534 a reliability indicator is set to high. In contrast, if three or fewer base stations were available, sub-process 530 may branch from decision block 540 to block 542. At block 542 the reliability indicator is reliability indicator is set to low. In the scenario illustrated in FIG. 5, subprocess 530 ends with a reliability indicator set either to "high" or "low." Accordingly, FIG. 5 represents an embodiment in which the reliability indicator may be a binary flag. In this example, the binary flag is set to a value indicating whether the location information collected at block 522 meets regulatory requirements for accuracy in selecting a white space channel. Though, it should be appreciated that FIG. 5 is illustrative rather than limiting of techniques for representing reliability, and any suitable representation of reliability may be generated by a subprocess 530. Moreover, it should be appreciated that FIG. 5 illustrates a subprocess in which a cellular telephone is configured to obtain location information in one of two ways, either through GPS or through triangulation. In embodiments in which a cellular telephone is configured for determining location in different or additional ways, the criteria used to determine reliability in subprocess 530 may be different so as to correspond to the techniques for determining location. Moreover, it should be appreciated that in some embodiments, reliability information may not be provided. Accordingly, in some scenarios, subprocess 530 may be omitted.

Regardless of whether and the manner in which reliability information is generated, method 500 may proceed to block 544. At block 544 white space information may be transmitted over the peer-to-peer connection established in subprocess 510. In the scenario illustrated in FIG. 5, the white space information transmitted at block 544 may simply be the location information collected at block 522. Though, as noted above, white space information may be formatted in any suitable way.

Regardless of the format of the white space information, method 500 may proceed to decision block 550. At decision block 550, the method 500 may branch, based on whether updates to white space information have been requested and/or whether an update is available. If so, the process may branch from decision block 550 to loop back to block 522. At block 522, acts associated with collecting location information may be repeated to obtain updated location information. Conversely, if no update is available and/or updates have not been requested, the method 500 may end. Though, it should be appreciated that FIG. 5 illustrates a simplified method for controlling a component configured for cellular communication, and that various alternatives are possible. For example, when updates to white space information have been requested, but none are available, the method 500 may, rather than ending as illustrated in FIG. 5, wait until an update is available and then loop back to block 522.

As an example of another possible variation, FIG. 5 illustrates that the cellular telephone implementing method 500 maintains a peer-to-peer connection with the wireless device requesting white space information at block 520. In some embodiments, after white space information is transmitted, the peer-to-peer connection may be broken. In that scenario, transmitting an update may entail re-establishing a wireless connection with the wireless device requesting location information. Accordingly, it should be appreciated that multiple alternative or additional processing steps may be included in the method 500.

Figure 6:
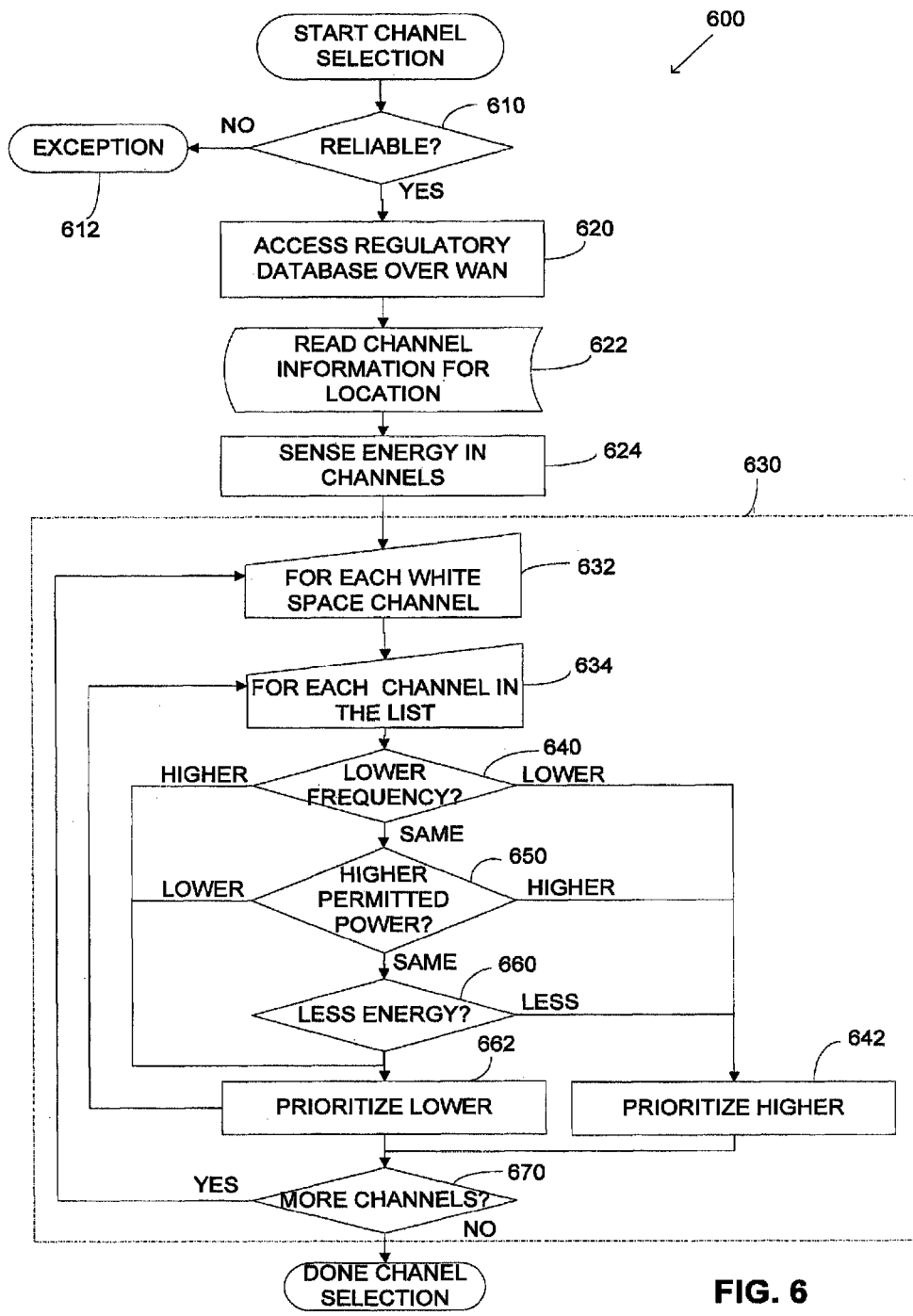
FIG. 6 is a flowchart of a method of prioritizing channels in a set of available white space channels.

A further example of an alternative may entail providing white space information as a prioritized list of channels. FIG. 6 illustrates a method 600 that may be performed by the cellular telephone executing method 500 to generate a list of prioritized channels that may be provided as white space information. Though, it should be appreciated that method 600 may be performed by any suitable device generating white space information. Alternatively or additionally, the method 600 may be executed by any suitable device receiving white space information.

Regardless of which device executes method 600, the method may begin at decision block 610. At decision block 610 the method 600 branches, depending on whether the location information used for channel selection meets reliability criteria. In some embodiments, the location information may meet reliability criteria if a reliability indicator is set too high, such as may occur by execution of the processing of block 534 (FIG. 5), described above. In this context, reliability may mean that location information is sufficiently accurate to meet regulatory requirements, though any suitable reliability criteria may be applied. Moreover, any suitable technique to determine reliability may be employed.

Regardless of the reliability criteria applied at decision block 610, if the location information is not reliable, method 600 may branch to exception processing block 612. Any suitable exception processing may be performed, and the specific exception processing may depend on the specific device that executes method 600. For example, when method 600 is executed by a cellular telephone providing white space information, if the information is not reliable, the cellular telephone may return no white space information or may return an error indication. In embodiments in which method 600 is executed by a wireless device receiving white space information, processing at exception handling block 612 may entail configuring the wireless device to communicate in an unlicensed spectrum or seeking other sources of information concerning the location of the wireless device and/or white space channels in the location.

Conversely, if processing at decision block 610 determines that the location information is reliable, method 600 may proceed to block 620. At block 620, a regulatory database may be accessed over a wide-area network. In embodiments in which method 600 is performed by a component configured for cellular communication, access to a wide-area network may be through the cellular network. When method 600 is performed by a wireless device, such as access point 152 (FIG. 1A) that is a part of an electronic device with an Internet connection, access to a wide-area network at block 620 may entail accessing a wide-area network, such as the Internet, through the Internet connection of the device. Regardless of the specific technique used to access the regulatory database, that access may entail reading channel information for the determined location of the wireless device at block 622. In embodiments in which the regulatory database is indexed by location, reading channel information at block 622 may entail using the determined location as a look-up key for the regulatory database. Though, it should be appreciated that the organization and method of access of the database is not critical to the invention, and any suitable technique may be used to obtain channel information for a determined location.

In some scenarios, multiple white space channels will be available in a location. Reading channel information at block 622 may therefore entail reading multiple white space channels. Subsequent processing within method 600 may entail prioritizing the white space channels. The channels may be prioritized according to any suitable criteria, but in this example, the channels are prioritized in accordance with their suitability for supporting computer-to-computer data communications.

In the example of FIG. 6 multiple criteria are used for prioritizing the channels. In this example, the criteria may include energy in the white space channels, frequency of the channels and/or permitted transmit power in the white space channels. However, it should be appreciated that different or additional criteria may be employed. Moreover, though FIG. 6 illustrates a method of applying a specific algorithm for prioritizing channels, different or additional prioritization algorithms may be applied.

In this example, the method 600 proceeds to block 624 where energy in the identified white space channels is sensed. Techniques for sensing energy in channels are known in the art. Such techniques are applied, for example, in collision-avoidance communication protocols. Such known energy-sensing techniques, and/or any other suitable energy-sensing technique, may be applied at block 624. Though, regardless of the specific technique used to sense energy in the white space channels, the sensed energy information may be employed in subprocess 630 to prioritize the white space channels.

Subprocess 630 begins at block 632. Block 632 represents the start of a loop that is performed for each of the white space channels determined by reading channel information at block 622. From block 632, subprocess 630 proceeds to block 634. Block 634 represents the start of a loop that is performed for each channel that has already been added to a list of prioritized channels. Processing at blocks 632 and 634 results in identification of a channel to be added to the list and a channel already in the list of prioritized channels.

Processing at decision blocks 640, 650, and 660 may entail a comparison of characteristics of these channels. At block 640, the frequency of the channel to be added to the list and a channel already in the list selected at block 634 are compared. If the channel to be added to the list has a lower frequency, subprocess 630 may branch from decision block 640 to block 642. At block 642 the channel to be added to the list is prioritized higher than the channel already in the list. Accordingly, the channel to be added to the list is inserted in the list above the selected channel already in the list. However, if the frequency of the channel to be added to the list is higher than the selected channel already in the list, subprocess 630 may branch from decision block 640 to block 662. At block 662, the channel to be added to the list is prioritized lower than the selected channel already in the list.

When the channel to be added to the list is prioritized lower than the selected channel already in the list, processing may loop back from block 662 to block 634. At block 634, the next channel already in the list will be selected and processing to compare the channel to be added to the list may be repeated for the newly selected channel already in the list. In this way, the channel to be added to the list will be compared successively to channels already in the prioritized list until a lower priority channel already in the list is identified. When such a channel is identified, processing will reach block 642 where the channel to be added is inserted in the list above than the identified lower priority channel already in the list.

Conversely, if processing at decision block 640 determines that the channel to be added to the list is the same frequency as the selected channel already in the list such that the relative priorities of the channels is not determined simply by the comparison performed at decision block 640, processing may proceed to decision block 650 where other criteria for determining a relative priority may be applied.

In this example, processing at decision block 650 compares the permitted transmit power levels for the channel to be added to the list and the selected channel already in the list. If the channel to be added to the list is permitted to transmit at a higher power, subprocess 630 may branch to block 642 where the channel to be added to the list is prioritized higher than the selected channel already in the list. If processing at decision block 650 determines that the channel to be added to the list has a lower permitted transmit power than the selected channel already in the list, the channel to be added to the list will similarly be assigned a lower priority, and processing branches from decision block 650 to block 662.

If the comparison performed at decision block 650 results in a determination that the channel to be added to the list is permitted to transmit at the same power as the selected channel already in the list, processing may proceed to decision block 660 where a further criteria may be applied. At decision block 660 subprocess 630 may again branch, depending on the relative levels of the detected energy in the channel to be added to the list and the selected channel already in the list. If the channel to be added to the list has less detected energy, meaning that the channel is less noisy or otherwise less likely to contain signals to interfere with communications in that channel, subprocess 630 may branch to block 642, where the channel to be added to the list is assigned a higher priority and positioned in the list to reflect that higher priority. Conversely, if the channel to be added to the list has the same or higher detected energy, subprocess 630 may branch from decision block 660 to block 662. At block 662, the channel to be added to the list is given a lower priority than the selected channel to be added to the list.

From block 662, processing may loop back to block 634 to select another channel in the list, if further channels remain. If all channels already assigned to the list have been processed, the channel to be added to the list is added to the end of the list and processing may then proceed to decision block 670.

At decision block 670, subprocess 630 may branch, depending on whether more white space channels remain to be processed. If more channels remain to be processed, subprocess 630 may loop back to block 632 where the next white space channel is obtained for processing. Subprocess 630 is repeated for this additional white space channel, similarly resulting in the white space channel being added, in priority order, to a list of white space channels. When all of the identified white space channels have been processed, method 600 may end with a prioritized list of white space channels.

In this example, subprocess 630 results in sorting a list of identified white space channels first by frequency, then by permitted transmit power and finally by detected energy in the white space channels. Any suitable algorithm for ordering the white space channels in a list may be employed instead of or in addition to the specific embodiment illustrated in FIG. 6. Moreover, it should be appreciated that the sorting criteria illustrated in FIG. 6 are not critical to the invention, and any suitable sorting criteria may be employed. Further, it should recognized that a sorted list, such as produced by the processing illustrated in FIG. 6, is just one technique for representing a prioritized set of white space channels. Any suitable representation of a set of prioritized white space channels may be used instead of or in addition to a prioritized list as described in connection with FIG. 6. Though, regardless of how the prioritized set of white space channels is obtained or represented, it may be used by a wireless device to select one or more white space channels for establishing wireless communication with one or more remote wireless devices. In the scenario illustrated in FIG. 5, sub-process 530 ends with a reliability indicator set either to "high" or "low." Accordingly, FIG. 5 represents an embodiment in which the reliability indicator may be a binary flag. In this example, the binary flag is set to a value indicating whether the location information collected at block 522 meets regulatory requirements for accuracy in selecting a light space channel. Though, it should be appreciated that FIG. 5 is illustrative rather than limiting of techniques for representing reliability, and any suitable representation of reliability may be generated by a sub-process 530. Moreover, it should be appreciated that FIG. 5 illustrates a sub-process in which a cellular telephone is configured to obtain location information in one of two ways, either through GPS or through triangulation. In embodiments in which a cellular telephone is configured for determining location in different or additional ways, the criteria used to determine reliability in sub-process 530 may be different so as to correspond to the techniques for determining location. Moreover, it should be appreciated that in some embodiments, reliability information may not be provided. Accordingly, in some scenarios, sub-process 530 may be omitted.

Regardless of whether and the manner in which reliability information is generated, method 500 may proceed to block 544. Block 544, white space information, may be transmitted over the peer-to-peer connection established in sub-process 510. In the scenario illustrated in FIG. 5, the white space information transmitted at block 544 may simply be the location information collected at block 522. Though, as noted above, white space information may be formatted in any suitable way.

Regardless of the formatting of the white space information, method 500 may proceed to decision block 550. At decision block 550, the method 500 may branch, based on whether updates to white space information have been requested and/or whether an update is available. If so, the process may branch from decision block 550 to loop back to block 522. At block 522, acts associated with collecting location information may be repeated, to obtain updated location information. Conversely, if no update is available and/or updates have not been requested, the method 500 may end. Though, it should be appreciated that FIG. 5 illustrates a simplified method for controlling a component configured for cellular communication, such as a cellular telephone, and that various alternatives are possible. For example, when updates to white space information have been requested, but none are available, the method 500 may, rather than ending as illustrated in FIG. 5, wait until an update is available and then loop back to block 522.

As an example of another possible variation, FIG. 5 illustrates that the cellular telephone implementing method 500 maintains a peer-to-peer connection with the wireless device requesting white space information at block 520. In some embodiments, after white space information is transmitted, the peer-to-peer connection may be broken. In that scenario, transmitting an update may entail re-establishing a wireless connection with the wireless device requesting location information. Accordingly, it should be appreciated that multiple alternative or additional processing steps may be included in the method 500.

A further example of an alternative may entail providing white space information as a prioritized list of channels. FIG. 6 illustrates a method 600 that may be performed by the cellular telephone executing method 500 to generate a list of prioritized channels that may be provided as white space information. Though, it should be appreciated that method 600 may be performed by any suitable device generating white space information. Alternatively or additionally, the method 600 may be executed by any suitable device receiving white space information. Regardless of which device executes method 600, the method may begin at decision block 610. At decision block 610 the method 600 branches, depending on whether the location information used for channel selection meets reliability criteria. In some embodiments, the location information may meet reliability criteria if a reliability indicator is set too high, such as may occur by execution of the processing of block 534 (FIG. 5), described above. Though, any suitable technique to determine reliability may be employed in this context, reliability may mean that location information is sufficiently accurate to meet regulatory requirements, though any suitable reliability criteria may be applied.

Regardless of the reliability criteria applied at decision block 610, if the location information is not reliable, method 600 may branch to exception processing block 612. Any suitable exception processing may be performed, and the specific exception processing may depend on the specific device that executes method 600. For example, when method 600 is executed by a cellular telephone providing white space information, if the information is not reliable, the cellular telephone may return no white space information or may return an error indication. In embodiments in which method 600 is executed by a wireless device receiving white space information, processing at exception handling block 612 may entail configuring the wireless device to communicate in an unlicensed spectrum or seeking other sources of information concerning the location of the wireless device and/or white space channels in the location.

Conversely, if processing at decision block 610 determines that the location information is reliable, method 600 may proceed to block 620. At block 620, a regulatory database may be accessed over a wide-area network. In embodiments in which method 600 is performed by a component configured for cellular communication, access to a wide-area network may be through the cellular network. When method 600 is performed by a wireless device, such as access point 152 (FIG. 1A) that is a part of an electronic device with an Internet connection, access to a wide-area network at block 620 may entail accessing a wide-area network, such as the Internet, through the Internet connection of the device. Regardless of the specific technique used to access the regulatory database, that access may entail reading channel information for the determined location of the wireless device at block 622. In embodiments in which the regulatory database is indexed by location, reading channel information at block 622 may entail using the determined location as a look-up key for the regulatory database. Though, it should be appreciated that the organization and method of access of the database is not critical to the invention and any suitable technique may be used to obtain channel information for a determined location.

In some scenarios, multiple white space channels will be available in a location. Reading channel information at block 622 may therefore entail reading multiple white space channels. Subsequent processing within method 600 may entail prioritizing the white space channels. The channels may be prioritized according to any suitable criteria, but in this example, the channels are prioritized in accordance with their suitability for supporting computer-to-computer data communications.

In the example of FIG. 6 multiple criteria are used for prioritizing the channels. In this example, the criteria may include energy in the white space channels, frequency of the channels and/or permitted transmit power in the white space channels. However, it should be appreciated that different or additional criteria may be employed. Moreover, though FIG. 6 illustrates a method of applying a specific algorithm for prioritizing channels, different or additional prioritization algorithms may be applied.

In this example, the method 600 proceeds to block 624 where energy in the identified white space channels is sensed. Techniques for sensing energy in channels are known in the art. Such techniques are applied, for example, in collision-avoidance communication protocols. Such known energy-sensing techniques, and/or any other suitable energy-sensing technique, may be applied at block 624. Though, regardless of the specific technique used to sense energy in the white space channels, the sensed energy information may be employed in a sub-process 630 of prioritizing the white space channel.

Sub-process 630 begins at block 632. Block 632 represents the start of a loop that is performed for each of the white space channels determined by reading channel information at block 622.

From block 632, sub-process 630 proceeds to block 634. Block 634 represents the start of a loop that is performed for each channel that has already been added to a list of prioritized channels. Processing at blocks 632 and 634 results in identification of a channel to be added to the list and a channel already in the list of prioritized channels. Processing decision blocks 640, 650, and 660 may entail a comparison of characteristics of these channels. At block 640, the frequency of the channel to be added to the list and a selected channel already in the list is compared. If the channel to be added to the list has a lower frequency, sub-process 630 may branch from decision block 640 to block 642. At block 642 the channel to be added to the list is prioritized higher than the channel already in the list. Accordingly, the channel to be added to the list is inserted in the list above the selected channel already in the list. However, if the frequency of the channel to be added to the list is higher than the selected channel already in the list, sub-process 630 may branch from decision block 640 to block 662. At block 662, the channel to be added to the list is prioritized lower than the selected channel already in the list.

When the channel to be added to the list is prioritized lower than the selected channel already in the list, processing may loop back from block 662 to block 634. At block 634, the next channel already in the list will be selected and processing to compare the channel to be added to the list may be repeated for the newly selected channel already in the list. In this way, the channel to be added to the list will be compared successively to channels already in the prioritized list until a channel is identified as a channel in relation to which the channel to be added is prioritized higher. When such a channel is identified, processing will reach block 642 where the channel to be added is inserted in the list with a higher priority than the identified channel already in the list.

Conversely, if processing at decision block 640 determines that the channel to be added to the list is the same frequency as the selected channel already in the list such that the relative priorities of the channels is not determined simply by the comparison performed at decision block 640, processing may proceed to decision block 650 where other criteria for determining a relative priority may be applied.

In this example, processing at decision block 650 compares the permitted transmit power levels for the channel to be added to the list and the selected channel already in the list. If the channel to be added to the list is permitted to transmit at a higher power, sub-process 630 may branch to block 642 where the channel to be added to the list is prioritized higher than the selected channel already in the list.

Similarly, if the comparison performed at decision block 650 results in a determination that the channel to be added to the list is permitted to transmit at the same power as the selected channel already in the list, processing may proceed to decision block 660. At decision block 660 sub-process 630 may again branch, depending on the relative levels of the detected energy in the channel to be added to the list and the selected channel already in the list. If the channel to be added to the list has less detected energy, meaning that the channel is less noisy or otherwise less likely to contain signals to interfere with communications in that channel, sub-process 630 may branch to block 642, where the channel to be added to the list is assigned a higher priority and positioned in the list to reflect that higher priority. Conversely, if the channel to be added to the list has the same or higher detected energy, sub-process 630 may branch from decision block 660 to block 662. At block 662, the channel to be added to the list is given a lower priority than the selected channel to be added to the list. Similarly, if as a result of the comparisons made at decision block 640 it is determined that the channel to be added to the list has a higher frequency than the selected channel to be added to the list, processing branches from decision block 640 to block 662 where the channel to be added to the list is assigned a lower priority than the selected channel already in the list. Likewise, if processing at decision block 650 determines that the channel to be added to the list has a lower permitted transmit power than the selected channel already in the list, the channel to be added to the list will similarly be assigned a lower priority, and processing branches from decision block 650 to block 662.

Figure 7:
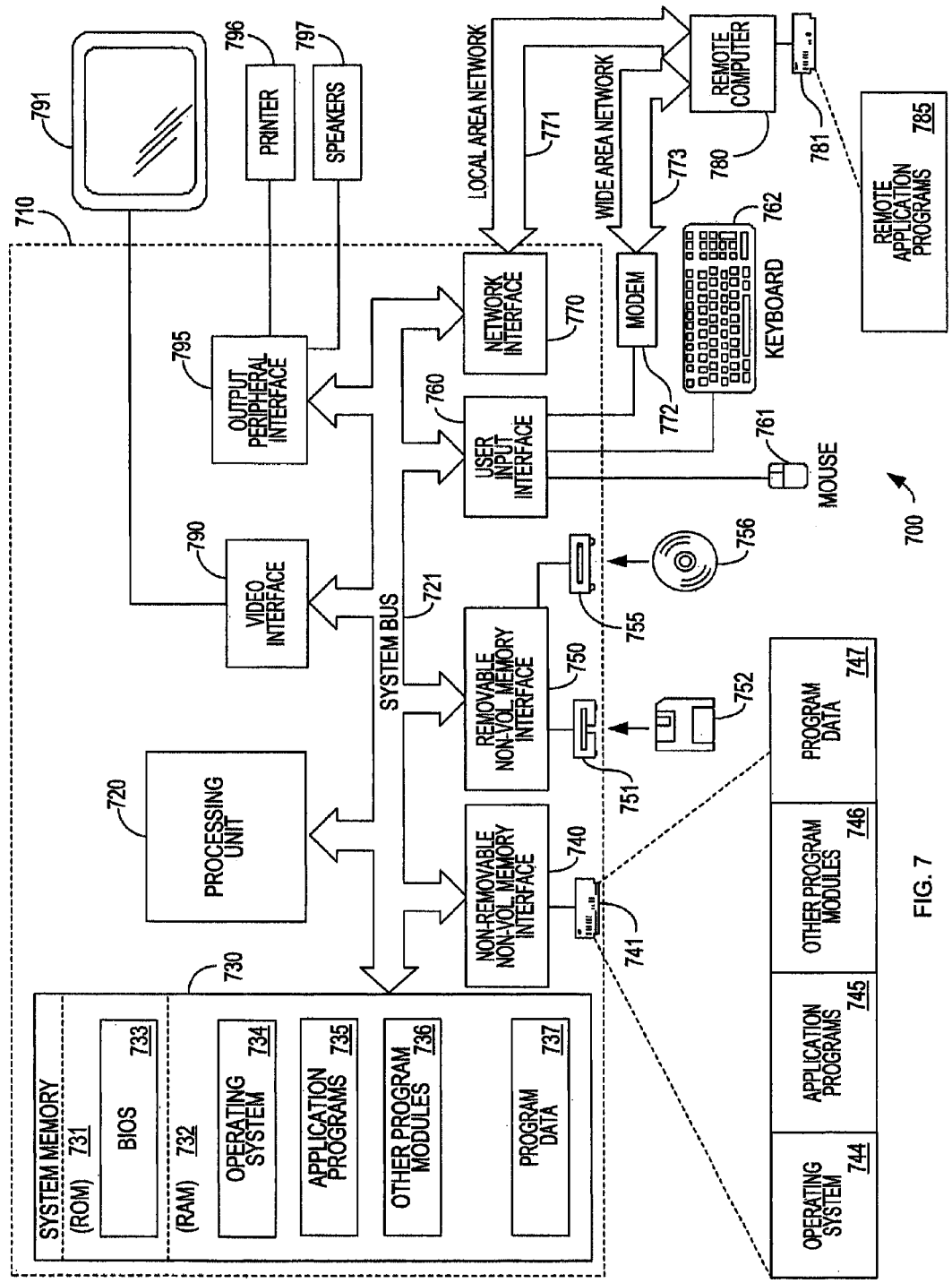
FIG. 7 is an architectural block diagram of a computing device that may be used in some embodiments of the invention.

From block 662 processing may loop back to block 634 to select another channel in the list, if further channels remain. If all channels already assigned to the list have been processed, the channel to be added to the list is added to the end of the list and processing may then proceed to decision block 670. At decision block 670, sub-process 630 may branch, depending on whether more white space channels remain to be processed. If more channels remain to be processed, sub-process 630 may loop back to block 632 where the next white space channel is obtained for processing. Sub-process 630 is repeated for this additional white space channel, similarly resulting in the white space channel being added, in a priority order, to a list of white space channels. When all of the identified white space channels have been processed, method 600 may end with a prioritized list of white space channels. In this example, sub-process 630 results in sorting a list of identified white space channels first by frequency, then by permitted transmit power and finally by detected energy in the white space channels. Any suitable algorithm for ordering the white space channels in a list may be employed instead of or in addition to the specific embodiment illustrated in FIG. 6. Moreover, it should be appreciated that the sorting criteria illustrated in FIG. 6 are not critical to the invention, and any suitable sorting criteria may be employed. Further, it should recognized that a sorted list, such as produced by the processing illustrated in FIG. 6, is just one technique for representing a prioritized set of white space channels. Any suitable representation of a set of prioritized white space channels may be used instead of or in addition to a prioritized list as described in connection with FIG. 6. Though, regardless of how the prioritized set of white space channels is obtained or represented, it may be used by a wireless device to select one or more white space channels for establishing wireless communication with one or more remote wireless devices Each of the processes described herein may be performed in any suitable type of device, including in devices with programmable computing capability. FIG. 7 illustrates an example of a suitable computing system environment 700 on which the invention may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the invention includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through an non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through a output peripheral interface 795.

The computer 710 may operate in a networked environment using logical connections to one or more remote computers, such as a remote computer 780.

The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating an electronic device to communicate in white space of an unassigned band of a licensed spectrum, the method comprising:

obtaining white space information from a component configured for cellular communication;

where the white space information comprises a reliability parameter and location information that is adapted for use in querying a white space database for usable channels in a location;

configuring a wireless communication sub-system of the electronic device for communication in a white space channel in response to the reliability parameter exceeding a threshold, where the reliability parameter indicates a degree of accuracy of the location information, and where the threshold indicates a desirable degree of accuracy;

where the configuring results in the electronic device being configured for operating as an access point in accordance with an infrastructure protocol; and where the obtaining the whitespace information comprises communicating over a peer-to-peer connection.

2. The method of claim 1, where the white space information comprises one or more white space channels available for use.

3. The method of claim 1, the method further comprising repeatedly querying the component for the white space information; and receiving the white space information in response to a query.

4. The method of claim 1, where the component configured for cellular communication comprises a cellular telephone separate from the electronic device.

5. The method of claim 1, where the obtaining the white space information comprises communicating over the peer-to-peer connection.

6. At least one computer-readable storage device storing computer-executable instructions that, when executed, control a portable electronic device configured for communication on a cellular band to perform a method comprising:

obtaining location information;

generating white space information based on the location information, the generating comprising indicating a higher reliability when the location information is generated using GPS and indicating a lower reliability when the location information is generated using triangulation based on communication with a number of base stations when the number is below a threshold, where the higher reliability and the lower reliability each indicate a degree of accuracy of the location information, and where the threshold indicates a desirable degree of accuracy, the generating further comprising obtaining, from a database and based on the location information, one or more white space channels in a location of the portable electronic device; and transmitting the white space information over a peer-to-peer connection.

7. The at least one computer-readable storage device of claim 6, where the generating the white space information comprises generating reliability information and where the transmitting the white space information comprises transmitting the reliability information.

8. The at least one computer-readable storage device of claim 7, where the generating the reliability information further comprises indicating the higher reliability when the location information is generated using triangulation based on communication with a number of base stations when the number is above the threshold.

9. The at least one computer-readable storage device of claim 6, the method further comprising repeatedly providing updates of the white space information.

10. A method of operating a portable electronic device configured for wireless communication over a cellular network, the method comprising:

obtaining location information;

determining whether the portable electronic device has changed location more than a threshold amount since the obtaining the location information, where the threshold amount indicates a maximum allowable distance;

accessing a database using a data connection through the cellular network to generate white space information based on the location information and, when the portable electronic device has changed location more than the threshold amount, updating the generated white space information based on the changed location of the portable electronic device;

associating with the white space information an indicator of reliability of the location information, where the indicator of reliability indicates a degree of accuracy of the location information; and communicating the white space information over a peer to peer connection.

11. The method of claim 10, wherein:

the white space information comprises a plurality of white space channels; and the method further comprises attaching an order of desirability to the plurality of white space channels based on one or more of a frequency of each white space channel, permitted transmit power for each white space channel, or detected activity on each white space channel.

12. The method of claim 10, where the obtaining the location information comprising accessing a GPS component within the portable electronic device.

13. The method of claim 10, where the obtaining the location information comprising computing the location information based on signals received from at least three cellular base stations.

14. The method of claim 10, further comprising communicating the indicator of reliability in conjunction with the white space information.

\* \* \* \* \*